United States Patent
Yamauchi

(10) Patent No.: US 8,991,689 B2
(45) Date of Patent: Mar. 31, 2015

(54) IMAGE FORMING APPARATUS WITH REDUCTION LAYOUT FUNCTION, IMAGE FORMING METHOD, AND STORAGE MEDIUM STORING CONTROL PROGRAM THEREFOR

(71) Applicant: Canon Kabushiki Kaisha, Tokyo (JP)

(72) Inventor: Manabu Yamauchi, Kashiwa (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/970,915

(22) Filed: Aug. 20, 2013

(65) Prior Publication Data

US 2014/0054364 A1   Feb. 27, 2014

(30) Foreign Application Priority Data

Aug. 22, 2012  (JP) ................. 2012-183268

(51) Int. Cl.
*G06F 17/00* (2006.01)
*G06K 1/12* (2006.01)
*H04N 1/32* (2006.01)
*H04N 1/387* (2006.01)

(52) U.S. Cl.
CPC ............ *G06K 1/121* (2013.01); *H04N 1/32144* (2013.01); *H04N 1/387* (2013.01); *H04N 2201/3269* (2013.01)
USPC ......................................... 235/375

(58) Field of Classification Search
USPC ......................................... 235/375, 380, 454
See application file for complete search history.

(56) References Cited

U.S. PATENT DOCUMENTS

2014/0166761 A1*  6/2014 Todeschini et al. ...... 235/472.01

FOREIGN PATENT DOCUMENTS

JP   2006-259045 A   9/2006

* cited by examiner

*Primary Examiner* — Jamara Franklin
(74) *Attorney, Agent, or Firm* — Rossi, Kimms & McDowell LLP

(57) ABSTRACT

An image forming apparatus minimizes necessary code area and reserves imaging area of suitable size for forming reduction document images. A code symbol detection unit detects first and second code symbols on first and second sheets, respectively. A code information obtaining unit obtains first and second code information from the detected first and second codes, respectively. A code symbol generation unit generates composite code symbol from the first and second code information, respectively. An area reservation unit reserves a code area in which the composite code symbol of a predetermined size more than the minimum readable size can be arranged in an image formable area of a sheet, and defines an imaging area by removing the code area from the image formable area. An arrangement unit arranges the composite code symbol in the code area, and reduces and arranges multiple images in the imaging area.

11 Claims, 18 Drawing Sheets

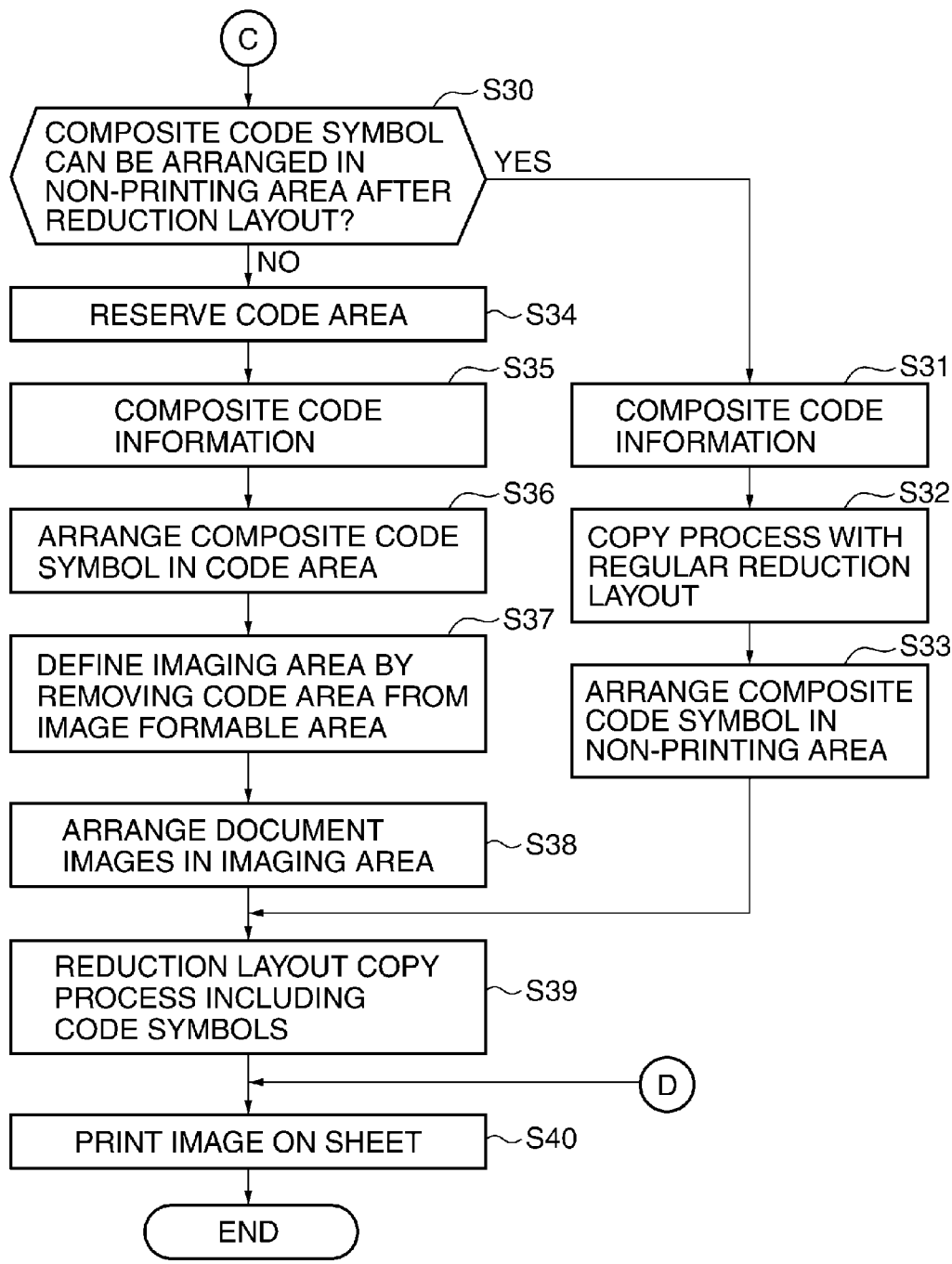

IMAGE FORMING APPARATUS WITH REDUCTION LAYOUT FUNCTION, IMAGE FORMING METHOD, AND STORAGE MEDIUM STORING CONTROL PROGRAM THEREFOR

BACKGROUND OF THE INVENTION

1. Field of the Invention

The present invention relates to an image forming apparatus with a reduction layout function that reduces and arranges document images of multiple pages into one page to print the page on a sheet. Particularly, the present invention relates to an image forming technique about documents containing code symbols, such as bar codes and QR Codes (registered trademark).

2. Description of the Related Art

There is a conventional image forming apparatus that prints code symbols, such as bar codes and QR codes (registered trademark), on a sheet together with characters or images as a marking method for prohibiting copying in a purpose of merchandise management and leakage prevention of personal information or confidential information, etc. On the other hand, there is an image forming apparatus with a reduction layout function that reduces and arranges document images of multiple consecutive pages into one page to print the page on a sheet.

When a code symbol is printed on a sheet, reduction of a layout using the reduction layout function may disable from reading information from the code symbol. Accordingly, when multiple-page documents containing code symbols are reduced and laid out, a code area required to arrange the code symbols of a predetermined size more than the minimum readable size is reserved. Then, the code symbols of the predetermined size are arranged in the code area, and the document images are reduced and arranged in an imaging area formed by removing the code area from an image formable area (see Japanese Laid-Open Patent Publication (Kokai) No. 2006-259045 (JP 2006-259045A)). The reduction layout method disclosed in this publication will be described using FIG. 17.

As shown in FIG. 17, code symbols 902-1 and 902-2 are printed on documents 901-1 and 901-2, respectively. When the two documents 901-1 and 901-2 are reduced as-is so as to be printed in the reduction layout (two-up printing), the code symbols 902-1 and 902-2 may become smaller than the minimum readable size. Accordingly, the code area 904 required to arrange the two code symbols 902-1 and 902-2 of the predetermined size is reserved in the image formable area of the sheet 903. Then, the code symbols 902-1 and 902-2 are converted into conversion code symbols 905-1 and 905-2 of the predetermined size, and the conversion code symbols are arranged in the code area 904.

Moreover, the images of the documents 901-1 and 901-2 are reduced to the document images 907-1 and 907-2, which are arranged in the imaging area 906 formed by removing the code area 904 from the image formable area of the sheet 903 in the reduction layout. Then, the conversion code symbols 905-1 and 905-2 of the predetermined size, and the document images 907-1 and 907-2 are formed as a reduction layout image. This enables to read the code symbols even in the reduction layout.

However, the above-mentioned method needs to reserve the code area in which the code symbols of the predetermined size can be arranged. Accordingly, when four documents are reduced and laid out in one page (four-up layout), or when eight documents are reduced and laid out in one page (eight-up layout), the imaging area that is formed by removing the code area from the image formable area becomes extremely small. As a result, the size of the document image of a desired reduction layout differs from the size of an actual document image significantly.

SUMMARY OF THE INVENTION

The present invention provides an image forming apparatus, a control method therefor, and a storage medium storing a control program therefor, which are capable of minimizing a necessary code area and reserving an imaging area of suitable size for forming reduction document images.

Accordingly, a first aspect of the present invention provides an image forming apparatus having a reduction layout function that reduces and arranges multiple images to one page of a sheet, comprising a code symbol detection unit configured to detect a first code symbol on a first sheet and second code symbol on a second sheet, a code information obtaining unit configured to obtain first code information from the first code symbol and second code information from the second code symbol, a code symbol generation unit configured to generate a composite code symbol by compositing the first code information and the second code information, an area reservation unit configured to reserve a code area in which the composite code symbol of a predetermined size more than the minimum readable size can be arranged in an image formable area of a sheet, and to define an imaging area by removing the code area from the image formable area of the sheet, and an arrangement unit configured to arrange the composite code symbol in the code area, and to reduce and arrange the multiple images in the imaging area.

Accordingly, a second aspect of the present invention provides an image forming method for an image forming apparatus having a reduction layout function that reduces and arranges multiple images to one page of a sheet, the image forming method comprising a code symbol detection step of detecting a first code symbol on a first sheet and second code symbol on a second sheet, a code information obtaining step of obtaining first code information from the first code symbol and second code information from the second code symbol, a code symbol generation step of generating a composite code symbol by compositing the first code information and the second code information, an area reservation step of reserving a code area in which the composite code symbol of a predetermined size more than the minimum readable size can be arranged in an image formable area of a sheet, and defining an imaging area by removing the code area from the image formable area of the sheet, and an arrangement step of arranging the composite code symbol in the code area, and reducing and arranging the multiple images in the imaging area.

Accordingly, a third aspect of the present invention provides a non-transitory computer-readable storage medium storing a control program causing a computer to execute the image forming method according to the second aspect.

According to the present invention, the code area in which a new code symbol is arranged is minimized, and the suitable imaging area, which is formed by removing the code area from the image formable area of the sheet, can be reserved.

Further features of the present invention will become apparent from the following description of exemplary embodiments with reference to the attached drawings.

BRIEF DESCRIPTION OF THE DRAWINGS

FIG. 10B is a flowchart showing the remainder of the reduction layout process of the image forming apparatus in the second embodiment of the present invention.

DESCRIPTION OF THE EMBODIMENTS

Hereafter, embodiments according to the present invention will be described in detail with reference to the drawings.

Figure 1:
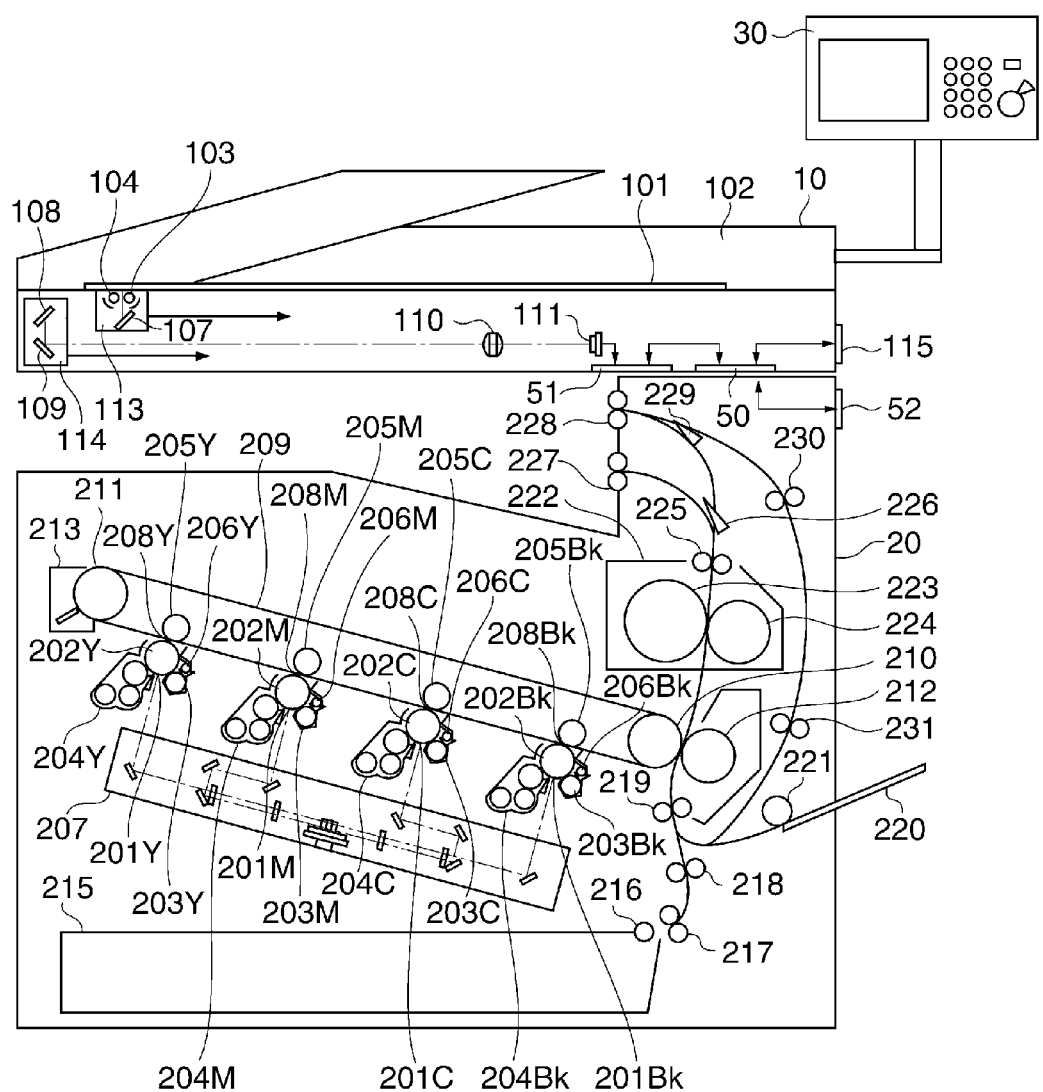
FIG. 1 is a view schematically showing a configuration of an image forming apparatus according to a first embodiment of the present invention.

FIG. 1 is a view schematically showing a configuration of an image forming apparatus according to a first embodiment of the present invention.

The image forming apparatus of the first embodiment is provided with a color reading unit 10 that reads a document image, a color printing unit 20 that forms an image on a recording sheet, an operation unit 30 that displays information to a user and receives user's operations, and a control unit 50 that controls the entire image forming apparatus.

The color reading unit 10 is provided with a contact glass (platen) 101 and an automatic document feeding device (ADF) 102.

The document arranged on the platen 101 or the document automatically conveyed by the ADF 102 is illuminated with light sources 103 and 104. The reflected light from the document forms an image of the document on a CCD (charge coupled device) image sensor (hereafter referred to as "CCD") 111 with a lens 110 via mirrors 107 through 109. A reader-scanner control unit 51 processes an image signal read by the CCD 111, and sends it to the control unit 50. The light sources 103, 104 and the mirror 107 are contained in a carriage 113. The mirrors 108 and 109 are contained in a carriage 114.

When a document conveyed by the ADF 102 is read, the carriages 113 and 114 are settled at the positions shown in FIG. 1. When the document arranged on the platen 101 is read, the carriage 113 moves at velocity V, and the carriage 114 moves at velocity V/2, in the direction shown by the arrow in FIG. 1 mechanically, and thus, the entire surface of the document is scanned. An external interface (I/F) 115 connects with other devices and exchanges data.

The operation unit 30 consists of an LCD with a touch panel that allows a user to input process execution contents and informs a user of information about the process and warning, and a key input unit (the detail of the operation unit 30 will be described below).

The control unit 50 once stores the image data read by the color reading unit 10 into a memory on the control unit, and transmits the image data on the memory to a printer control unit 52 as an image data signal in response to the demand from the printer control unit 52.

The color printing unit 20 is provided with a toner image forming unit 201Y that forms a yellow (Y) image, a toner image forming unit 201M that forms a magenta (M) image, a toner image forming unit 201C that forms a cyan (C) image, and a toner image forming unit 201Bk that forms a black (Bk) image. These four toner image forming units 201Y, 201M, 201C, and 201Bk are arranged at fixed intervals in line.

The toner image forming units 201Y, 201M, 201C, and 201Bk are provided with photosensitive drums 202Y, 202M, 202C, and 202Bk, respectively. Around the photosensitive drums 202Y, 202M, 202C, and 202Bk, primary electrostatic chargers 203Y, 203M, 203C, and 203Bk, development devices 204Y, 204M, 204C, and 204Bk, transfer rollers 205Y, 205M, 205C, 205Bk, drum cleaning devices 206Y, 206M, 206C, and 206Bk are arranged, respectively. A laser exposure device 207 is installed under the gaps between the primary electrostatic chargers 203Y, 203M, 203C, and 203Bk and the development devices 204Y, 204M, 204C, and 204Bk.

The toner image forming units 201Y, 201M, 201C, and 201Bk, and the laser exposure device 207 are controlled by the printer control unit 52, and transfer the toner images of the respective colors formed by the known electrophotography process onto an intermediate transfer belt 209 one by one in piles.

The intermediate transfer belt 209 is looped over a secondary transfer opposite roller 210, which counters a secondary transfer roller 212 and drives the intermediate transfer belt 209, and a tension roller 211.

A belt cleaning device 213 that removes and collects residual toner that remains on the surface of the intermediate transfer belt 209 is installed near the tension roller 211. Moreover, a fixing device 222 that has a fixing roller and a pressure roller is installed in the downstream side of a secondary transfer section in the conveyance direction of sheet as a vertical pass configuration.

A sheet is picked up by a pickup roller 216 from a sheet cassette 215, and is conveyed by a feeding roller pair 217 and a vertical conveying roller pair 218 to a registration roller pair 219. In the case of manual feeding, a sheet stacked on a manual bypass tray 220 is conveyed to the registration roller pair 219 with a manual feed roller 221. Then, the sheet is conveyed to the gap between the intermediate transfer belt 209 and the secondary transfer roller 212 at the timing of which the toner images have been transferred to the intermediate transfer belt 209. Then, the sheet is conveyed in the direction toward the fixing unit 222 under the condition where the sheet is nipped between the secondary transfer roller 212 and the intermediate transfer belt 209. During the conveyance, the sheet is pressed to the intermediate transfer belt 209, and the toner images on the intermediate transfer belt 209 are secondarily transferred to the sheet.

The toner images transferred to the sheet are heated and pressurized by the fixing roller 223 and the pressure roller 224 of the fixing device 222, and the toner images are fixed onto the sheet. The sheet on which the images were fixed is conveyed by a fixing conveying roller pair 225, and is discharged by a discharge roller pair 227 by directing a first flapper 226 toward the discharge roller pair 227 in the case of single side printing. In the case of double-sided printing, the sheet is once conveyed to an inverting roller pair 228 by directing the first flapper 226 and a second flapper 229 to the inverting roller pair 228. Then, the sheet is inverted by the inverting roller pair 228, and is conveyed to double-sided conveying roller pairs 230 and 231 by switching the second flapper 229 to a double-sided path. The sheet is suspended on the double-sided path, and is fed again immediately the toner images are prepared so as to form images on the second surface.

Figure 2:
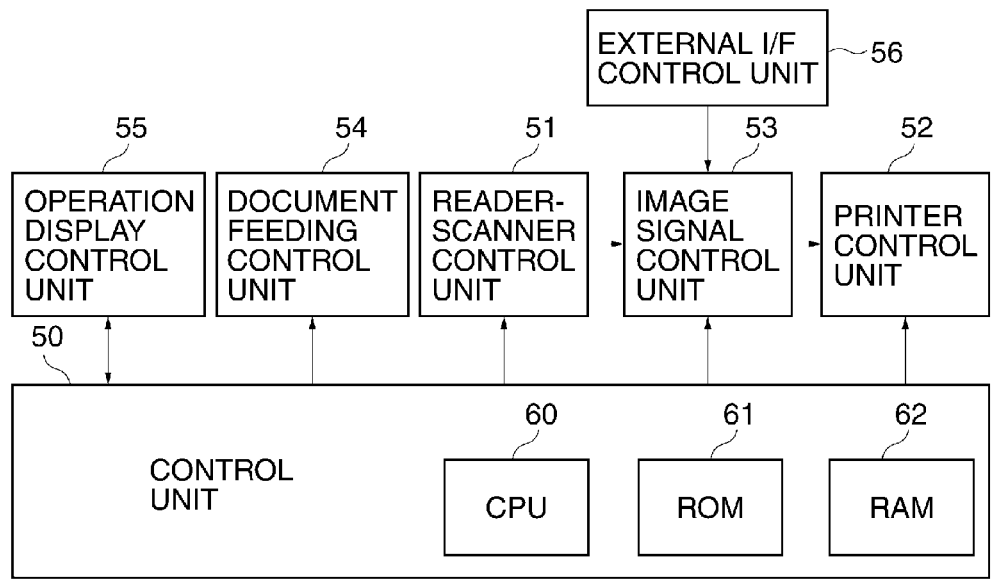
FIG. 2 is a block diagram schematically showing a configuration of a control unit in FIG. 1.

Next, the configuration of the control unit 50 in the image forming apparatus in FIG. 1 will be described with reference to FIG. 2. FIG. 2 is a block diagram schematically showing the configuration of the control unit 50 in FIG. 1.

As shown in FIG. 2, the control unit 50 is constituted by a CPU 60, a ROM 61, and a RAM 62. The control unit 50 generally controls the reader-scanner control unit 51, the printer control unit 52, an image signal control unit 53, a document feeding control unit 54, an operation display control unit 55, and an external I/F control unit 56 by means of a control program stored in the ROM 61.

The RAM 62 stores control data temporarily, and is used as a working area of the arithmetic process accompanying control.

The document feeding control unit 54 controls the ADF 102 based on instructions from the control unit 50. The reader-scanner control unit 51 controls the color reading unit 10, and transmits the analog signal outputted from the CCD 111 to the image signal control unit 53.

The image signal control unit 53 converts the analog signal from the CCD 111 into a digital signal, applies various processes to the digital signal, converts the digital signal into a video signal, and outputs it to the printer control unit 52.

Moreover, the image signal control unit 53 applies various processes to a digital image signal inputted from a computer (not shown) etc. through the external I/F control unit 56, converts the digital signal into a video signal, and outputs it to the printer control unit 52. The printer control unit 52 drives the color printing unit 20 based on the inputted video signal.

The operation display control unit 55 transfers key signals corresponding to operations of the touch panel and the key input unit of the operation unit 30 to the control unit 50, and displays information corresponding to the signal from the control unit 50 on the LCD of the operation unit 30.

Figure 3:
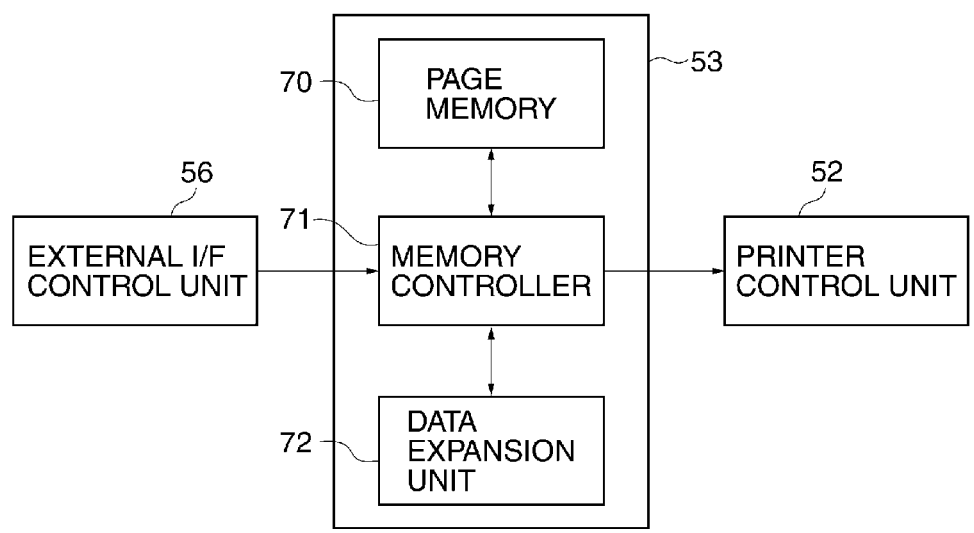
FIG. 3 is a block diagram schematically showing a configuration of an image signal control unit shown in FIG. 2.

The image signal control unit 53 is provided with a page memory 70 that consists of a memory like a DRAM, a memory controller 71, and a data expansion unit 72, as shown in FIG. 3.

The memory controller 71 determines whether the image data received from the external device through the external I/F control unit 56 is compressed data. Then, when determining that it is compressed data, the memory controller 71 performs an expansion process using the data expansion unit 72, and then, writes the expanded data into the page memory 70. When it is not compressed data, the memory controller 71 writes image data in the page memory 70 as-is.

The memory controller 71 generates a DRAM refresh signal for the page memory 70, and arbitrates between the writing from the external I/F control unit 56 and the access to the page memory 70 to the read-out to the printer control unit 52. Furthermore, the memory controller 71 controls a writing address to the page memory 70, a reading address from the page memory 70, a reading direction, etc. according to instructions from the CPU 60.

Figure 4:
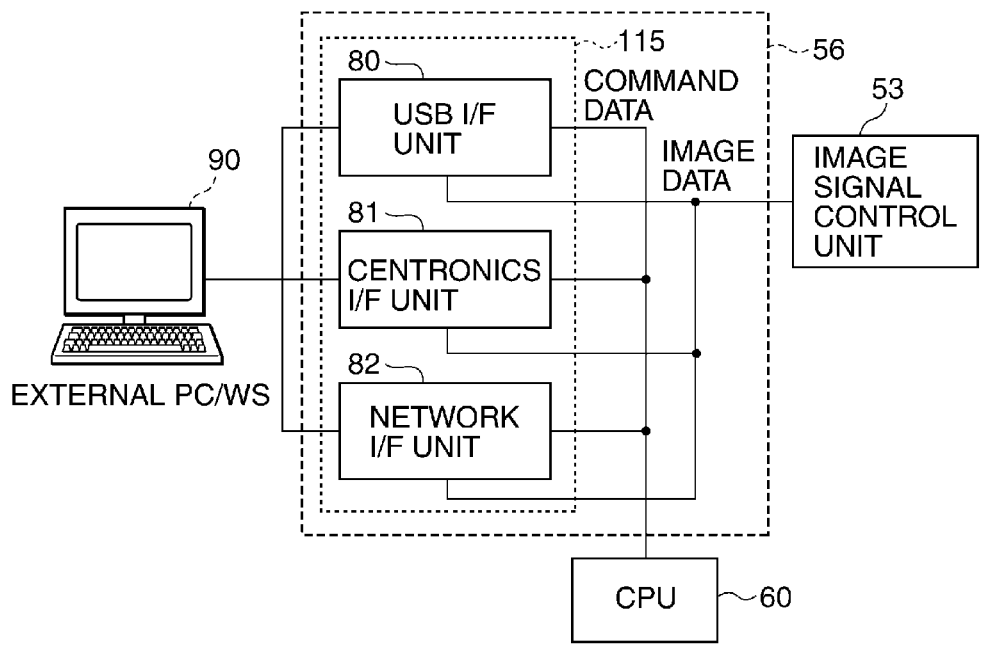
FIG. 4 is a block diagram schematically showing a configuration of an external I/F control unit in FIG. 2.

The external I/F control unit 56 receives the image data and print command data that are transmitted from the external apparatus 90 through a USB I/F unit 80, a centronics I/F unit 81, or a network I/F unit 82, as shown in FIG. 4. Moreover, the external I/F control unit 56 transmits the status information about the printer control unit 52 etc. that is determined by the CPU 60 to the external apparatus 90. The external apparatus 90 is a computer (PC), a work station (WS), or the like.

The CPU 60 processes the print command data received from the external apparatus 90 through the USB I/F unit 80, the centronics I/F unit 81, or the network I/F unit 82, and generates setting and timing of which the printer control unit 52 executes a printing operation.

The image data received from the external apparatus 90 through the USB I/F unit 80, the centronics I/F unit 81, or the network I/F unit 82 is transmitted to the image signal control unit 53 at the timing determined by the print command data. Then, the image data is processed so that the printer control unit 52 forms an image.

Figure 5:
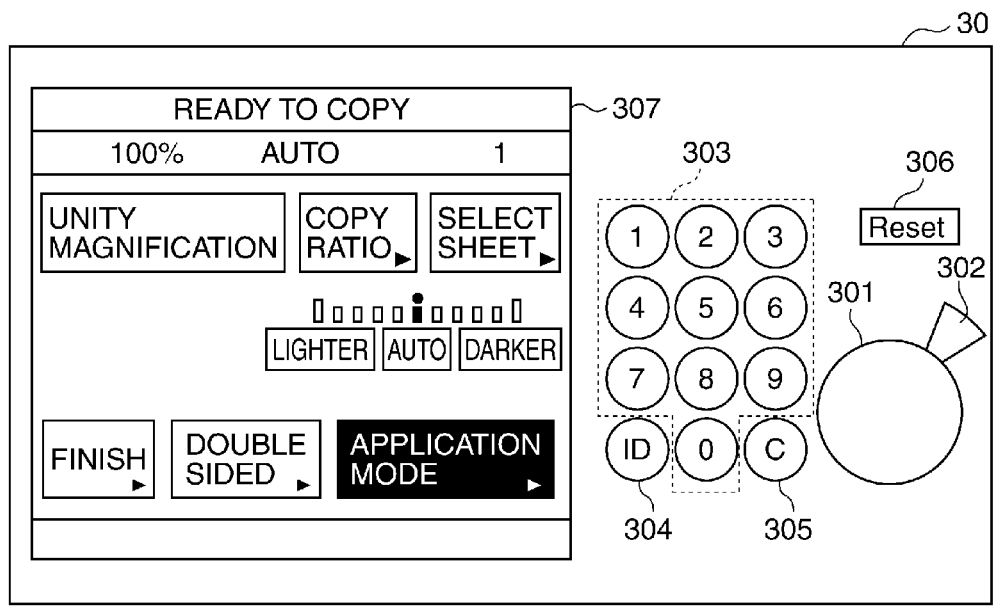
FIG. 5 is a view showing an external configuration of an operation unit in FIG. 1.

As shown in FIG. 5, the operation unit 30 has a start key 301 for starting an image forming operation, a stop key 302 for interrupting an image forming operation, a ten-key pad 303 used for inputting numerals, an ID key 304, a clear key 305, a reset key 306, etc. as a key input unit. Moreover, the operation unit 30 is provided with the display unit 307 that is constituted with the LCD with a touch panel that realizes softkeys on a screen.

A user can select a sheet type, designate one-side printing or double-sided printing, set the image forming operations, such as print mode, with the softkeys realized on the display unit 307. The operation display control unit 55 transmits the operations with the hardkey of the key input units and the softkeys of the display unit 307 to the CPU 60, and displays the state of the image forming apparatus and the setting information received from the CPU 60 on the display unit 307.

Next, the reduction layout function in the image forming apparatus in FIG. 1 will be described with reference to FIG. 6 through FIG. 8. The reduction layout function reduces and arranges multiple pages of document images into one page to print them on a sheet.

Figure 6:
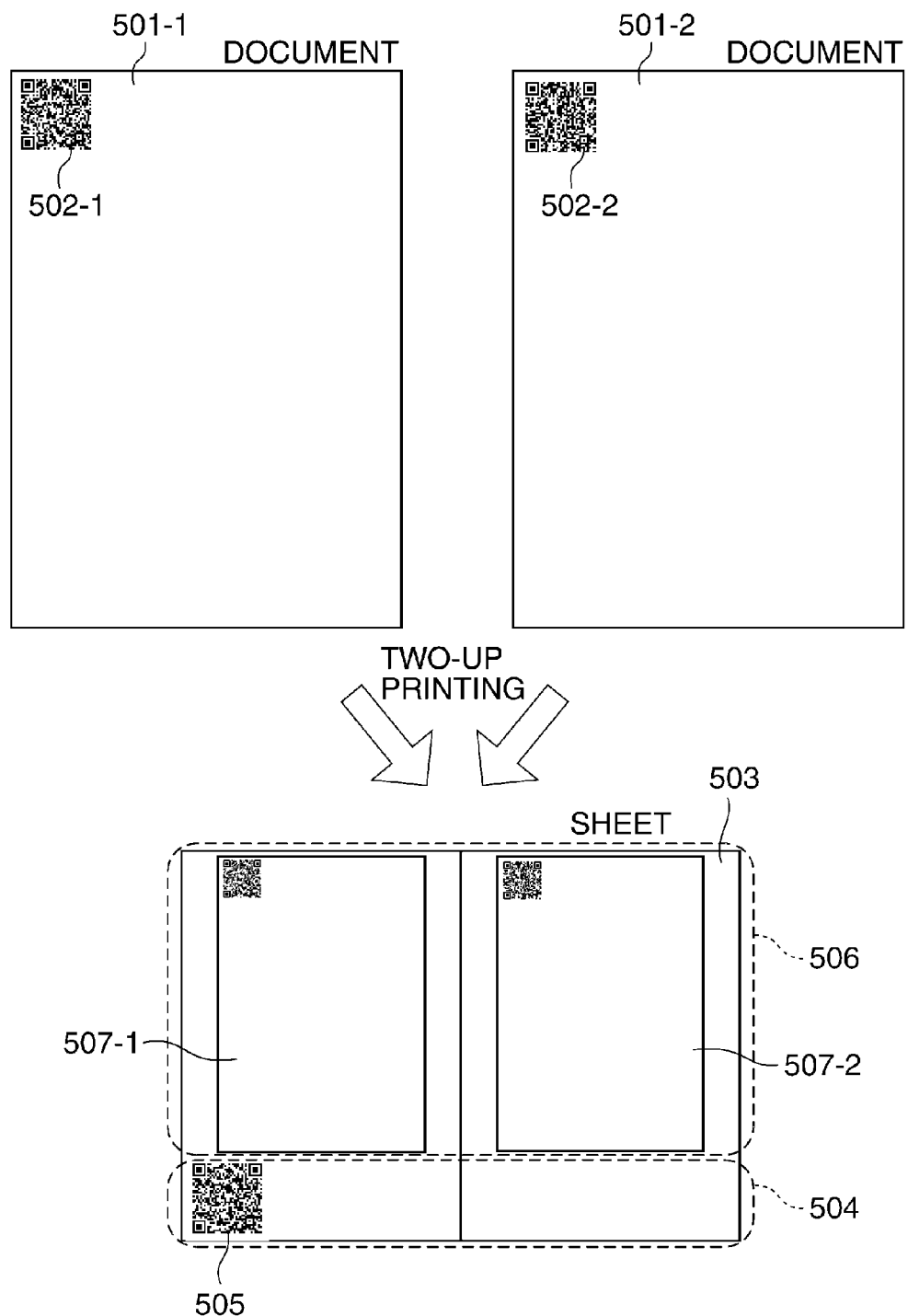
FIG. 6 is a view schematically showing a reduction layout method in two-up printing in the first embodiment of the present invention.

FIG. 6 is a view schematically showing a reduction layout method in two-up printing in the first embodiment of the present invention.

A code symbol 502-1 is included in an image of a document 501-1, and a code symbol 502-2 is included in an image of a document 501-2. When the two documents 501-1 and 501-2 are reduced and laid out in one sheet 503 as-is (two-up printing), the code symbols 502-1 and 502-2 may become smaller than the minimum readable size.

Accordingly, code information about the code symbols 501-1 and 502-2 is analyzed, and a composite code symbol 505 as a new code symbol is generated by compositing the two pieces of the code information. Then, a code area 504 in which the composite code symbol 505 of a predetermined size can be arranged is reserved in the image formable area of the sheet 503. The predetermined size is more than the minimum readable size in which an image of a code symbol is readable without loss of code information about the code symbol.

Then, the composite code symbol 505 of the predetermined size is arranged in the code area 504. A document image 507-1 that is reduction of the document 501-1 and a document image 507-2 that is reduction of the document 501-2 are arranged in an imaging area 506 that is formed by removing the code area 504 from the image formable area 503 of the sheet. As a result, the composite code symbol 505 of the predetermined size is printed in the code area 504, the document images 507-1 and 507-2 are printed in the imaging area 506 as reduction layout images.

Figure 7:
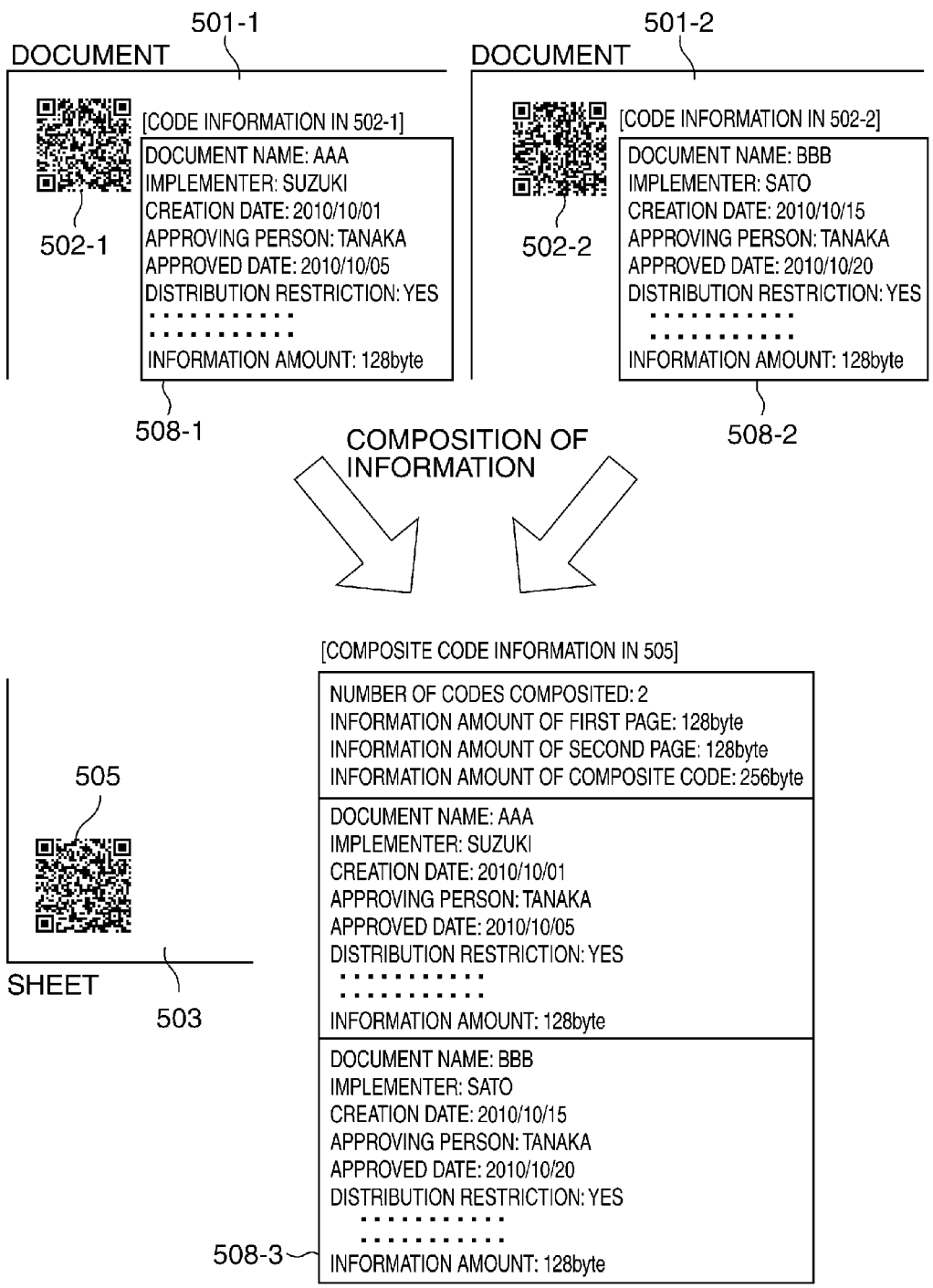
FIG. 7 is a view showing information about a composite code symbol.

FIG. 7 is a view showing information about the composite code symbol 505.

The code symbols 501-1 and 502-2 shown in FIG. 6 include code information 508-1 and code information 508-2, respectively, for the security purpose of documents, for example. Each code information 508-1 and 508-2 contains a document name, an implementer, a creation date, an approving person, an approved date, and distribution restriction of a document, etc., for example. Moreover, the amount of the information about all the codes, etc. are included.

When multiple pieces of code information are composited, the code information 508-1 and the code information 508-2 are composited into one piece of code information 508-3, and the number of the codes composited, the information amount of each page, the information amount of the composite code, etc. are added to the composite code. The code symbols 501-1 and 502-2 can be replaced with the composite code symbol 505 by generating the composite code symbol 505 based on the code information 508-3.

Figure 8A:
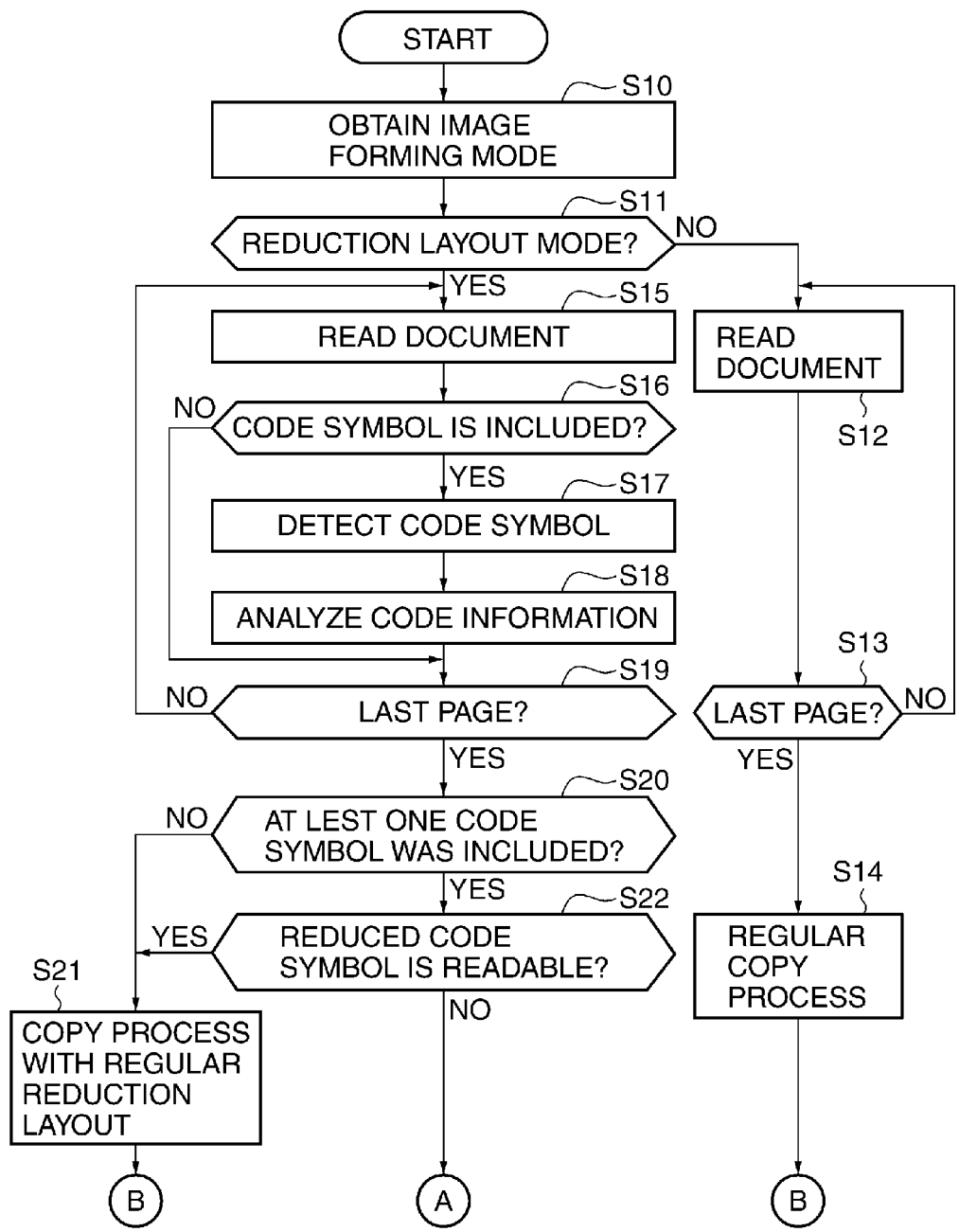
FIG. 8A is a flowchart showing a part of a reduction layout process of the image forming apparatus in the first embodiment of the present invention.
Figure 8B:
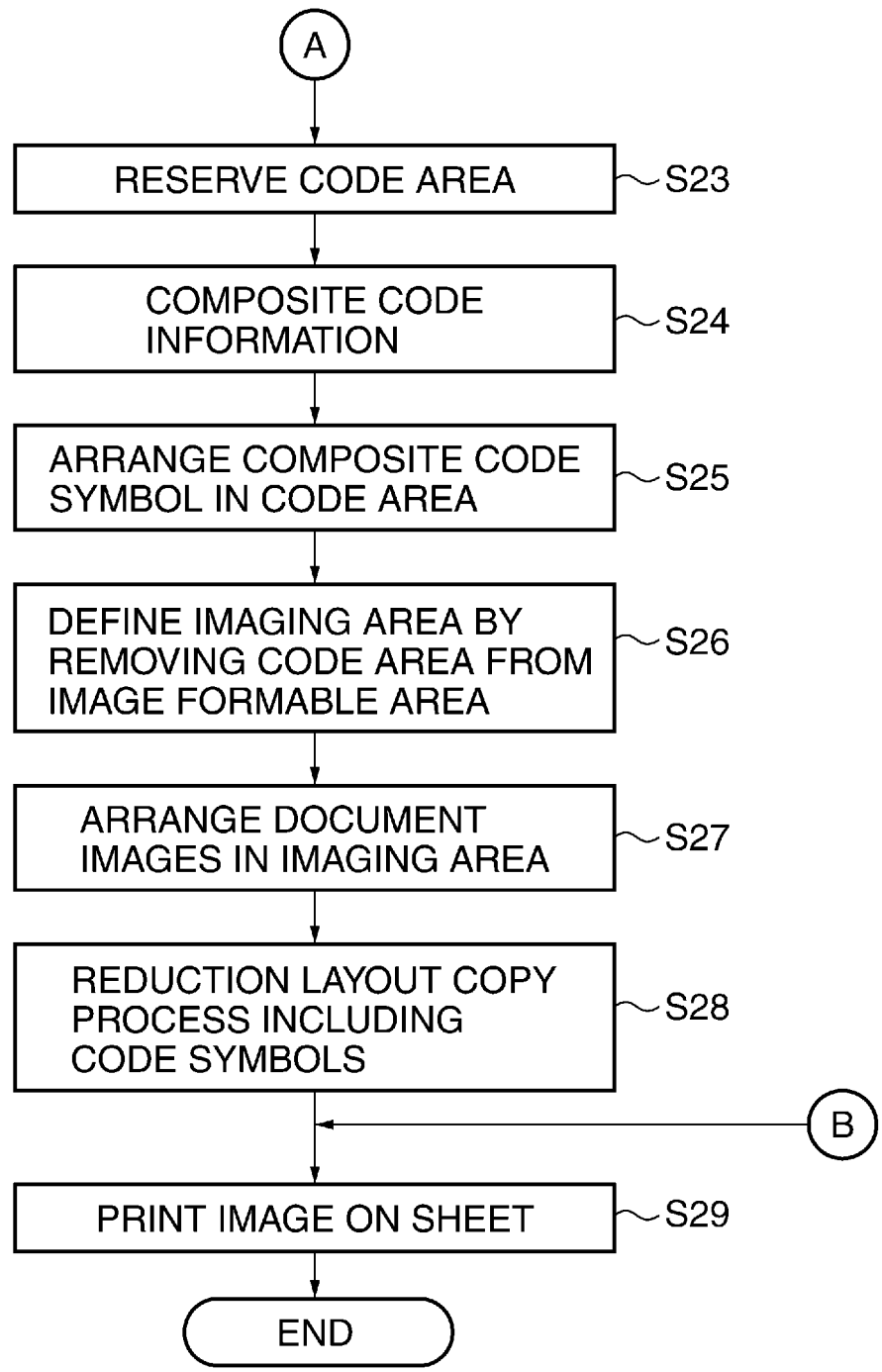
FIG. 8B is a flowchart showing the remainder of the reduction layout process of the image forming apparatus in the first embodiment of the present invention.

FIG. 8B and FIG. 8B are flowcharts showing the reduction layout process of the image forming apparatus in the first embodiment of the present invention.

As shown in FIG. 8A, when a user presses the start key 301 of the operation unit 30 to instruct to start an image forming operation, the control unit 50 obtains an image forming mode from the operation display control unit 55 (step S10).

In the next step S11, the control unit 50 determines whether the obtained image forming mode is the reduction layout mode in which images of multiple-page documents 501-1 and 501-2 are reduced and arranged into one page and are printed on the sheet 503. When determining that the current mode is not the reduction layout mode (NO in the step S11), the control unit 50 instructs the document feeding control unit 54 and the reader-scanner control unit 51 to read a document (step S12), and determines whether the document that is being read is the last page (step S13). Then, the control unit 50 repeats reading of the document in the step S12 until detecting the last page of the documents in the step S13. When detecting the last page of the documents in the step S13, the control unit 50 performs a regular copy process in the step S14, and proceeds with the process to step S29 in FIG. 8B.

On the other hand, when determining that the current mode is the reduction layout mode (YES in the step S11), the control unit 50 instructs to read the document 501-1 (501-2) (step S15), and determines whether the read document 501-1 (501-2) includes a code symbol 502 (step S16).

When there is the code symbol 502 (YES in the step S16), the control unit 50 detects the code symbol 502 (step S17), analyzes the code information 508 about the code symbol 502 (step S18), obtains the code information 508 to store it in the RAM 62, and proceeds with the process to step S19. When there is no code symbol 502 (NO in the step S16), the control unit 50 skips the steps S17 and S18, and proceeds with the process to the step S19.

In the step S19, the control unit 50 determines whether the document that is being read is the last page. When determining that the current page is not the last page, the control unit 50 returns the process to the step S15 and repeats the process in the steps S15 through S18. On the other hand, when determining that the current page is the last page in the step S19, the control unit 50 proceeds with the process to step S20.

In the step S20, the control unit 50 determines whether the code symbol 502 was included in the read document image. When at least one document 501-1 (501-2) includes a code symbol 502, the control unit 50 determines whether the code symbol 502 is readable even if the code symbol 502 is reduced (step S22). When no document includes a code symbol 502 (NO in the step S20), or when the code symbol 502 reduced is readable even if the code symbol 502 is included (YES in the step S22), the control unit 50 performs a copy process with the designated regular reduction layout (step S21), and proceeds with the process to the step S29 in FIG. 8B.

On the other hand, when at least one document includes a code symbol 502 (YES in the step S20) and the code symbol reduced is not readable (NO in the step S22), the control unit 50 proceeds with the process to step S23 in FIG. 8B.

In the step S23 in FIG. 8B, the control unit 50 reserves the code area 504 in which the code symbol of the predetermined size more than the minimum readable size can be arranged.

In the next step S24, the control unit 50 reads the code information 508 analyzed in the step S18 from the RAM 62, composites it to generate a new composite code symbol 505.

It step S25, the control unit 50 resizes the generated composite code symbol 505 to the predetermined size, and arranges it in the code area 504 reserved in the sep S23.

In the next step S26, the control unit 50 defines an imaging area 506 by removing the code area 504 from the image formable area of the sheet 503. In the next step S27, the control unit 50 reduces and arranges the images of the documents 501-1 and 501-2 so as to fit within the imaging area 506 reserved in the step S26.

In the next step S28, the control unit 50 copies the reduction layout image containing the composite code symbol 505. The layout process so far is performed because the control unit 50 gives instructions to the image signal control unit 53.

In the step S29, the control unit 50 gives instructions to the printer control unit 52 to form an image on the sheet 503, and finishes this process.

According to the above-mentioned embodiment, when multiple pages of documents are reduced and arranged to one page (the reduction layout), the code information about the code symbols for multiple pages is analyzed and a new code symbol is generated by compositing the code information analyzed. Then, the code area in which the new code symbol of the predetermined size can be arranged is reserved, and the imaging area is defined by removing the code area from the image formable area of the sheet. Furthermore, the new code symbol is arranged in the code area, and the multiple images are reduced and arranged in the imaging area. Thereby, the code area for arranging the new code symbol can be minimized, and the suitable imaging area can be reserved by removing the code area from the image formable area of the sheet.

Next, an image forming apparatus according to a second embodiment of the present invention will be described with reference to FIG. 9, FIG. 10A and FIG. 10B. Since the configuration shown in FIG. 1 through FIG. 5 of the above-mentioned first embodiment is common to the second embodiment of the present invention, the same sections are represented by the same reference numerals and the descriptions therefor are omitted. Hereafter, only points different from the first embodiment will be described.

Figure 9:
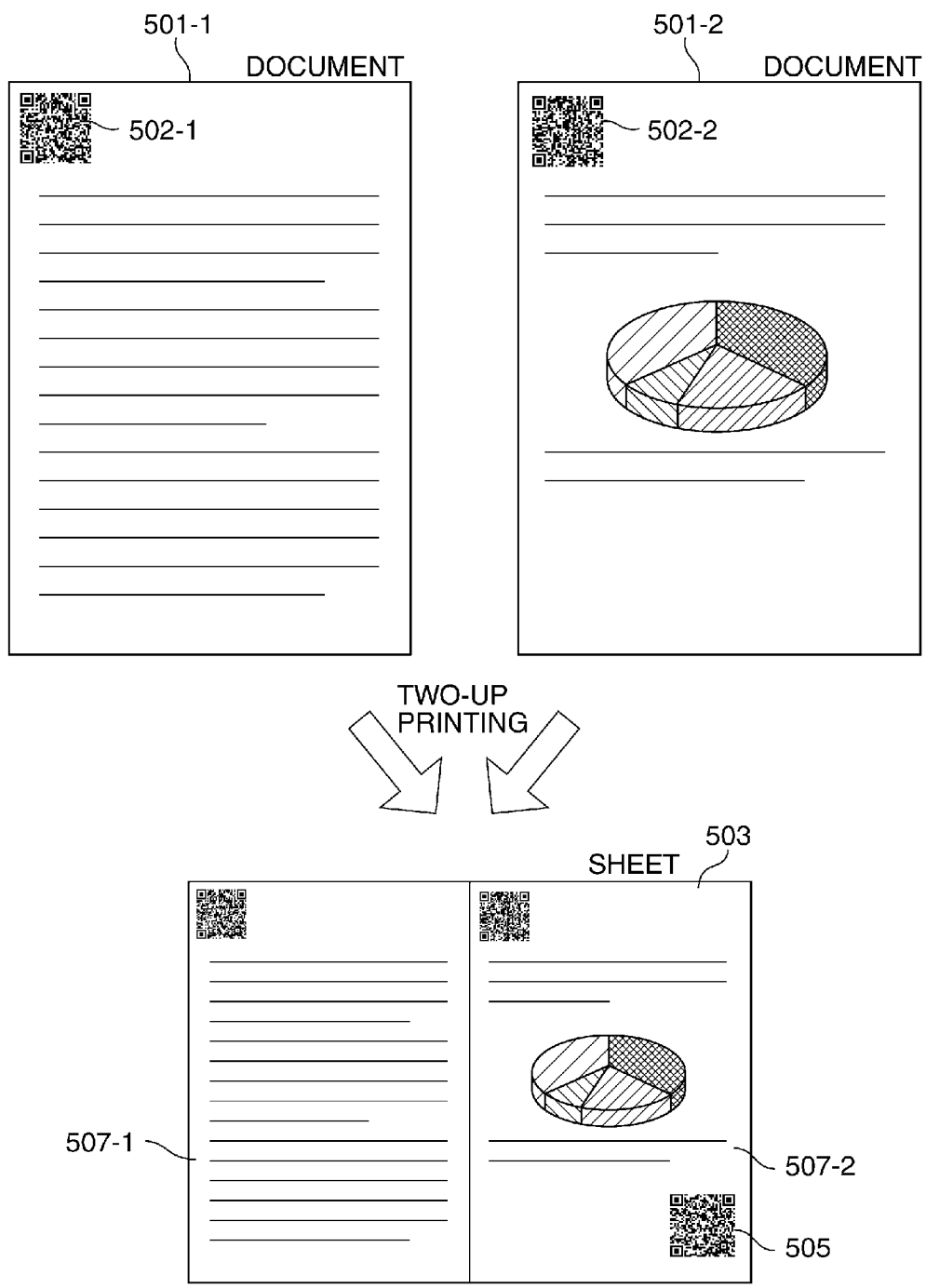
FIG. 9 is a view schematically showing a reduction layout method in two-up printing in a second embodiment of the present invention.

FIG. 9 is a view schematically showing a reduction layout method in two-up printing in the second embodiment of the present invention.

Code symbols 902-1 and 902-2 are included in documents 901-1 and 901-2, respectively. Characters and a graph are printed in the documents as shown in FIG. 9. There shall be a blank non-printing area without a character, a graph, etc. in the document 501-2. When the two documents 501-1 and 501-2 are reduced and laid out in one sheet 503 as-is (two-up printing), the code symbols 502-1 and 502-2 may become smaller than the minimum readable size. Accordingly, the code information about the code symbols 501-1 and 502-2 is analyzed, and a composite code symbol 505 that includes two pieces of code information is generated.

When the composite code symbol 505 of the predetermined size more than the minimum readable size can be arranged in the blank non-printing area that remains after the documents 501-1 and 501-2 are reduced and arranged in the sheet 503, it is unnecessary to reserve the code area that is described in the first embodiment.

Accordingly, the document images 507-1 and 507-2 that are reductions of the documents 501-1 and 501-2 are arranged in the image-formation area in the sheet 503 without reserving a code area, and the composite code symbol 505 of the predetermined size is arranged in the blank non-printing area. As a result, the composite code symbol 505 is formed in the non-printing area in the image-formation area of the sheet 503 in which the document images 507-1 and 507-2 are formed.

Figure 10A:
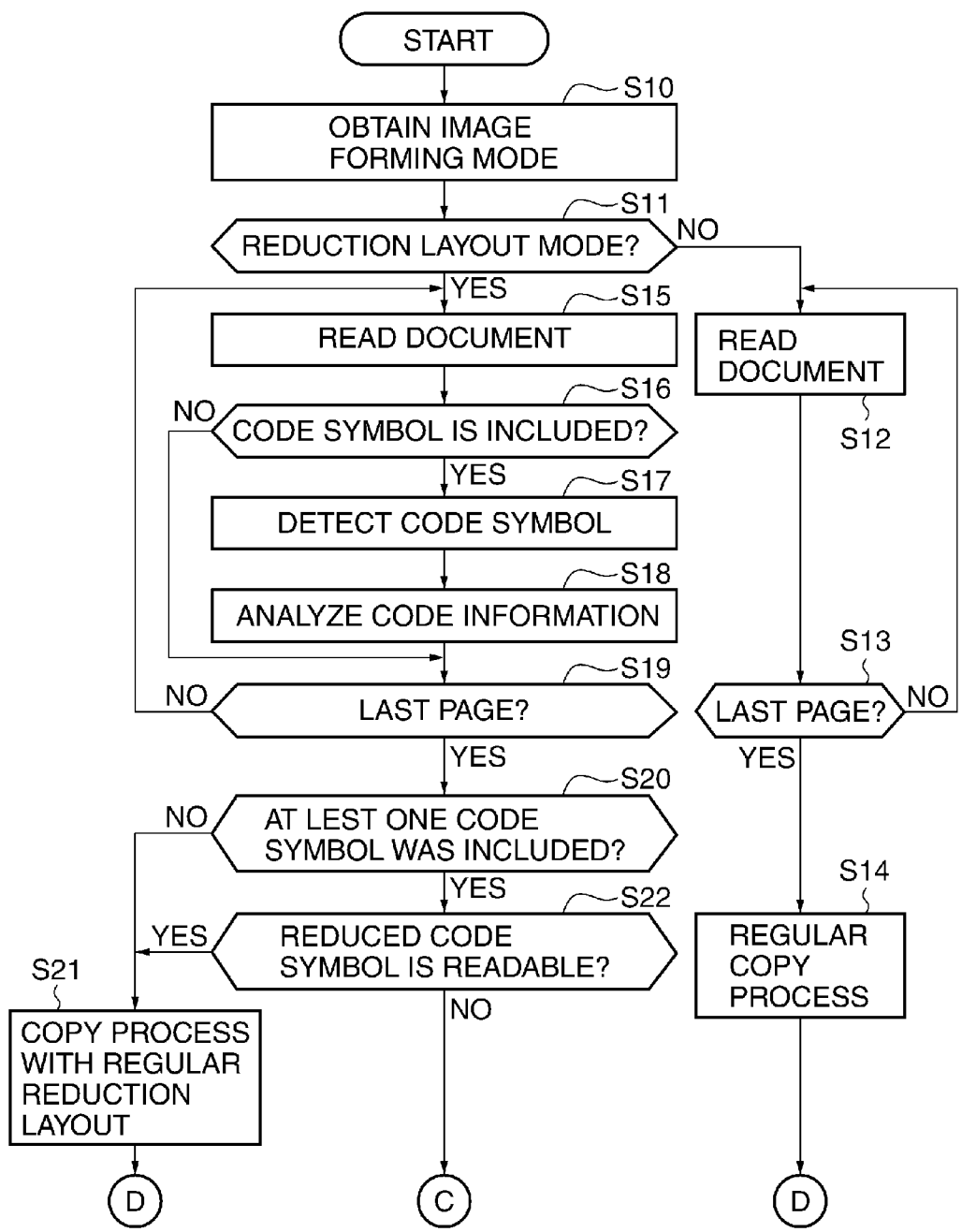
FIG. 10A is a flowchart showing a part of a reduction layout process of the image forming apparatus in the second embodiment of the present invention.

FIG. 10A and FIG. 10B are flowcharts showing a reduction layout process of the image forming apparatus in the second embodiment of the present invention. Since steps S1 through S22 in FIG. 10A are the same as the contents of process in the steps S1 through S22 in FIG. 8A described in the first embodiment, the descriptions therefor are omitted.

The above-mentioned first embodiment reserves the code area for the composite code symbol 505 whenever documents with code symbols 502 are reduced and laid out.

In the second embodiment, the control unit 50 determines whether a composite code symbol 505 of the predetermined size can be arranged within the non-printing area that remains after the images are arranged in the reduction layout in the image formable area in step S30. When it is determined that it cannot be arranged, the process proceeds to step S34 and the process similar to the first embodiment will be performed.

In the step S34, the control unit 50 reserves a code area 504 in which a composite code symbol 505 of the predetermined size can be arranged.

In the next step S35, the control unit 50 reads the code information 508 analyzed in the step S18 from the RAM 62, composites it, and generates a new composite code symbol 505. In the next step S36, the control unit 50 arranges the generated composite code symbol 505 of the predetermined size in the code area 504 reserved in the step S37.

In the next step S37, the control unit 50 defines an imaging area 506 by removing the code area 504 from the image formable area of the sheet 503. In the next step S38, the control unit 50 reduces and arranges the images of the documents 501-1 and 501-2 so as to fit within the imaging area 506 reserved in the step S37.

In the next step S39, the control unit 50 copies the reduction layout image containing the composite code symbol 505.

On the other hand, when the control unit 50 determines that the composite code symbol 505 of the predetermined size can be arranged within the non-printing area after the images are arranged in the reduction layout in step S30, the process proceeds to step S31. In step S31, the control unit 50 reads the code information 508 analyzed in the step S18 from the RAM 62 without reserving the code area 504, and composites it.

Next, the control unit 50 arranges the images of the documents 501-1 and 501-2 in the regular reduction layout (step S32), arranges the composite code symbol 505 of the predetermined size in the non-printing area (step S33), and proceeds with the process to the step S39.

The layout process so far is performed because the control unit 50 gives instructions to the image signal control unit 53.

In step S40, the control unit 50 gives instructions to the printer control unit 52 to form images on the sheet 503, and finishes this process.

According to the above-mentioned embodiment, when the composite code symbol can be arranged in the non-printing area that remains after the reduction images of the documents 501-1 and 501-2 are arranged, it is unnecessary to reserve a code area required to arrange the composite code, and the reduction images of the documents 501-1 and 501-2 can be printed at magnification of the regular reduction layout in which the code area is not reserved.

Next, an image forming apparatus according to a third embodiment of the present invention will be described with reference to FIG. 11 through FIG. 16B. Since the configuration shown in FIG. 1 through FIG. 5 of the above-mentioned first embodiment is common to the third embodiment of the present invention, the same sections are represented by the same reference numerals and the descriptions therefor are omitted. Hereafter, only points different from the first embodiment will be described.

Figure 11:
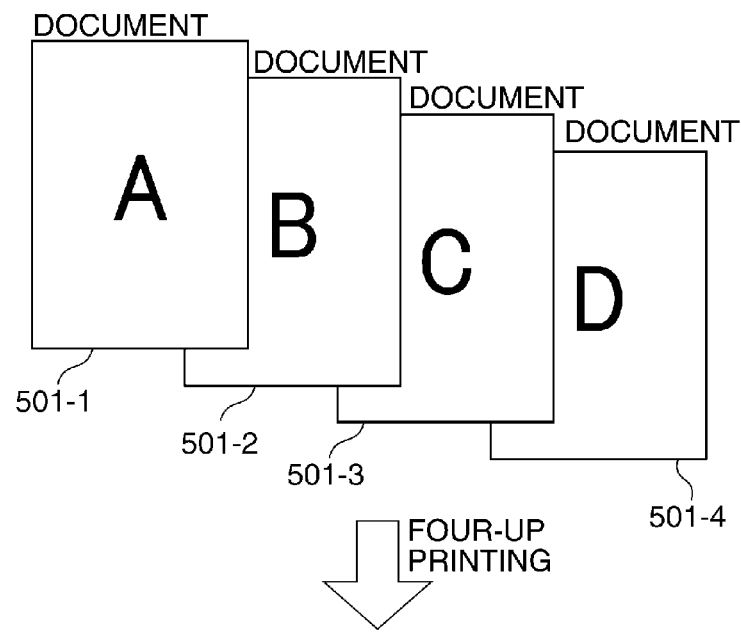
FIG. 11 is a view showing variations of reduction layout patterns in a third embodiment of the present invention.
Figure 11:
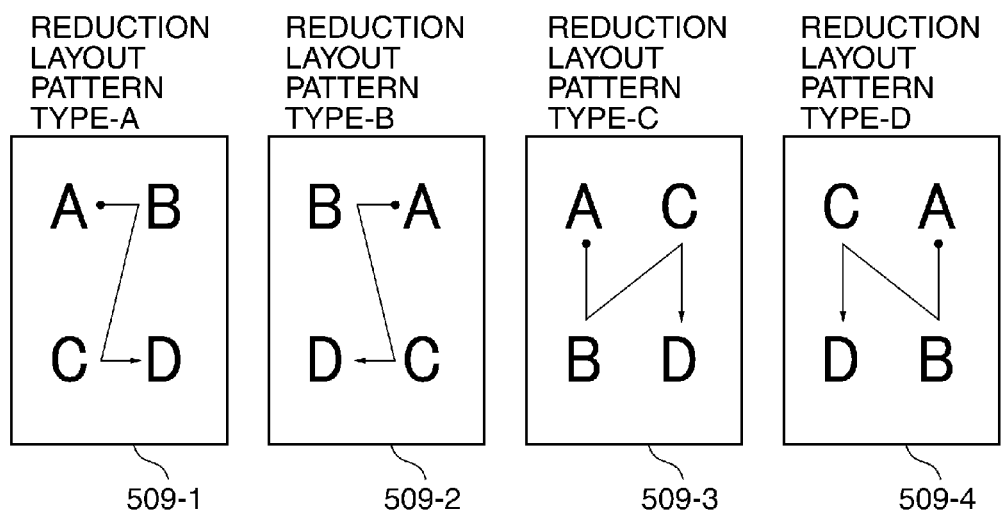

FIG. 11 is a view showing variations of reduction layout patterns in the third embodiment of the present invention.

The reduction layout function that reduces and arranges document images of multiple pages into one page and prints them on a sheet has some layout patterns. For example, when four documents 501-1 through 501-4 are laid out on one sheet 503, there are four reduction layout patterns 509-1 through 509-4 as shown in FIG. 11.

In the reduction layout pattern (Type-A) 509-1, an image A of a first document 501-1 is arranged at the upper left of the sheet, an image B of a second document 501-2 is arranged at the upper right of the sheet, an image C of a third document 501-3 is arranged at the lower left of the sheet, and an image D of a fourth document 501-4 is arranged at the lower right of the sheet. That is, the reduction layout pattern 509-1 arranges the first image at the upper left starting position, arranges the following images in the lateral direction sequentially as long as there is space to arrange an image in the lateral direction, and then, arranges the following images from the lower left position (left start and lateral arrangement).

Similarly, the reduction layout pattern (Type-B) 509-2 arranges the first image at the upper right starting position, and arranges the following images in the lateral direction sequentially (right start and lateral arrangement).

The reduction layout pattern (Type-C) 509-3 arranges the first image at the upper left starting position, and arranges the following images in the vertical direction sequentially (left start and vertical arrangement).

The reduction layout pattern (Type-D) 509-4 arranges the first image at the upper right starting position, and arranges the following images in the vertical direction sequentially (right start and vertical arrangement).

This embodiment describes the four-up reduction layout that reduces and arranges four pages of documents 501-1, 501-2, 501-3, and 501-4 into one sheet 503. The method described in this embodiment is also applicable to multiple-up reduction layout more than four, such as eight-up reduction layout that reduces and arranges eight pages of documents into one sheet.

Figure 12:
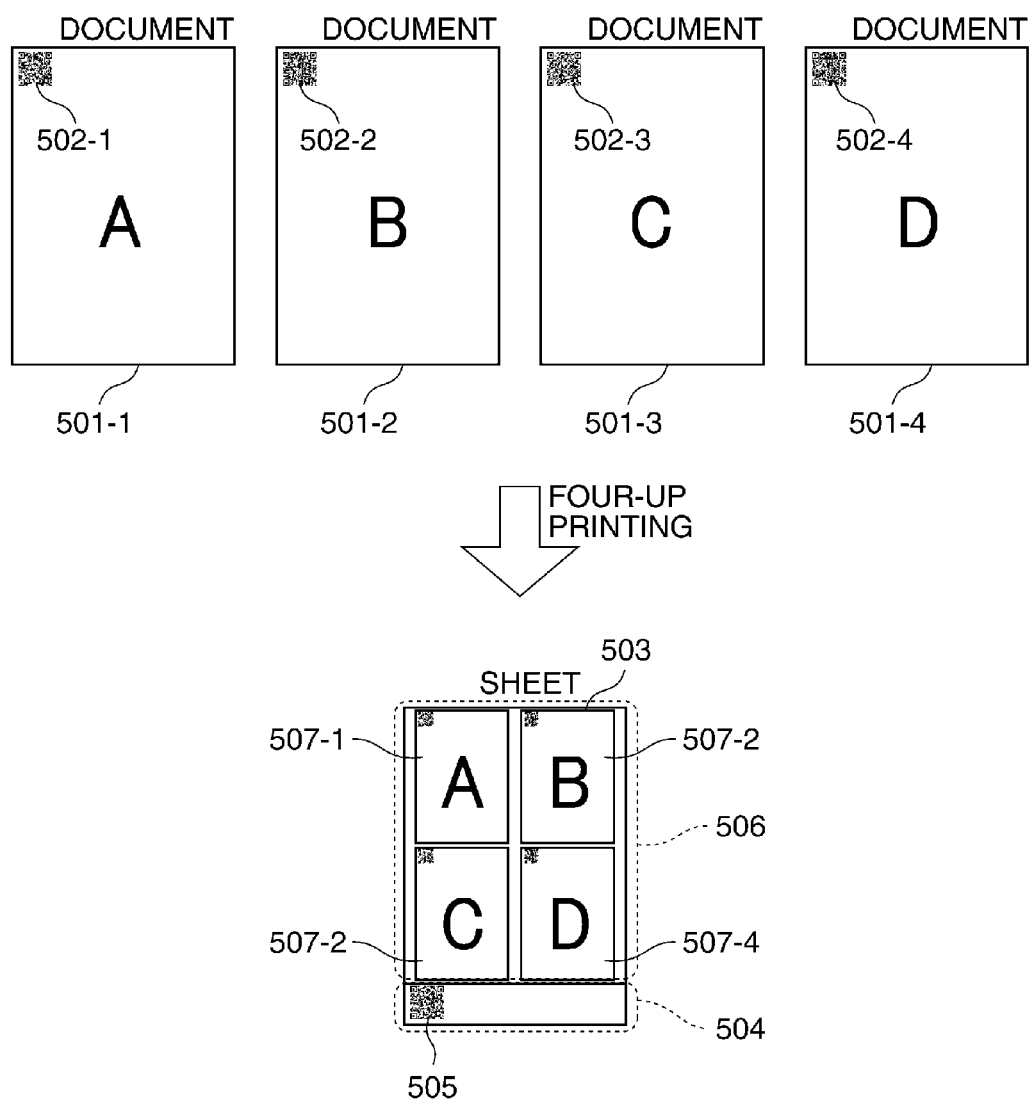
FIG. 12 is a view schematically showing a reduction layout method in four-up printing in the third embodiment of the present invention.

FIG. 12 is a view schematically showing a reduction layout method in four-up printing in the third embodiment of the present invention.

This embodiment will describe the case where the four documents 501-1 through 501-4 are laid out in one sheet 503 in the reduction layout pattern Type-A (four-up printing).

Code symbols 502-1 through 502-4 are included in the four documents 501-1 through 501-4, respectively. When the four documents 501-1 through 501-4 are reduced and laid out in one sheet 503 as-is (four-up printing), the code symbols 502-1 through 502-4 may become smaller than the minimum readable size. Accordingly, the code information about the code symbols 502-1 through 502-4 is analyzed, and a composite code symbol 505 that includes four pieces of code information is generated. Then, a code area 504 in which the composite code symbol 505 of the predetermined size more than the minimum readable size can be arranged is reserved in the image formable area of the sheet 503. The composite code symbol 505 of the predetermined size is arranged in the code area 504.

Moreover, the images of the documents 501-1 through 501-4 are reduced to the document images 507-1 through 507-4, which are arranged in an imaging area 506 formed by removing the code area 504 from the image formable area of the sheet 503. As a result, the composite code symbol 505 of the predetermined size is printed in the code area 504, the document images 507-1 through 507-4 are printed in the imaging area 506 as reduction layout images.

As described in the above-mentioned second embodiment, if the composite code symbol can be arranged in the non-printing area that remains after the reduction images of the documents 501-1 through 501-4 are arranged, it is unnecessary to reserve a code area required to arrange the composite code symbol, and the reduction images of the documents 501-1 through 501-4 can be printed at magnification of the regular layout in which the code area is not reserved.

Figure 13:
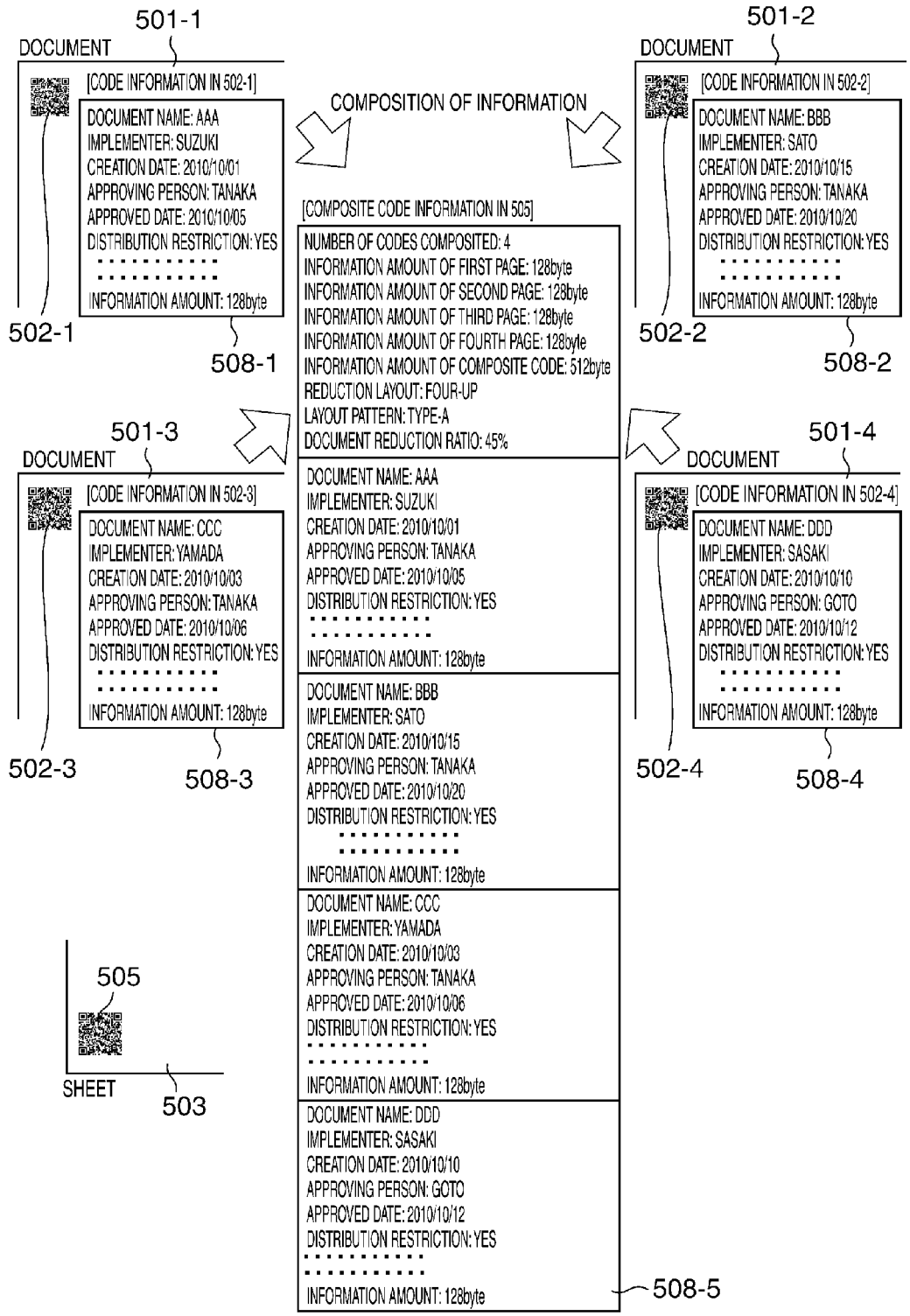
FIG. 13 is a view showing information about a composite code symbol containing reproduction code information in the four-up printing.

FIG. 13 is a view showing information about a composite code symbol containing reproduction code information in the four-up printing.

This embodiment will describe information about the composite code symbol in the case where the four documents 501-1 through 501-4 are arranged on one sheet 503 in the reduction layout (four-up printing).

The code symbols 502-1 through 502-4 shown in FIG. 12 include code information 508-1 through 508-4, respectively, for the security purpose of documents, for example. Each code information 508-1 through 508-4 contains a document name, an implementer, a creation date, an approving person, an approved date, and distribution restriction of a document, etc. Moreover, the amount of the information about all the codes, etc. are included.

Composition of the code information means to consolidate the four pieces of code information 508-1 through 508-4 into one piece of code information 508-5, and to add the number of composite codes (the number of pieces of code information), the information amount of each page, and the information amount of composite code (the total quantity of the code information about all the pages), etc. The code symbols 502-1 and 502-4 can be replaced with the composite code symbol 505 by generating the composite code symbol 505 based on the code information 508-5.

Moreover, the reduction layout type like the two-up, the reduction layout pattern described with reference to FIG. 11, and the document reduction ratio determined by the size of the imaging area were added to the code information 508-5.

Since the reduction layout process for documents using the composite code symbol of the third embodiment is the same as that of the process described with reference to FIG. 8A, FIG. 8B, FIG. 10A and FIG. 10B, the description therefor is omitted. It should be noted that the code information about the composite code symbol contains the reduction layout type like two-up, the reduction layout pattern, and the document reduction ratio determined by the size of the imaging area as the reproduction code information for reproducing the original documents before the reduction layout from the reduction image. This is different from the first and second embodiments.

Figure 14:
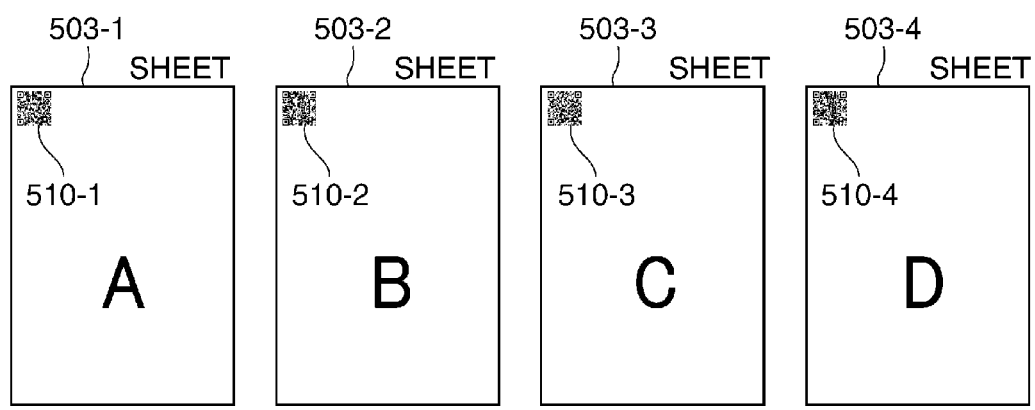
FIG. 14 is a view schematically showing a code reproduction method in the third embodiment of the present invention.
Figure 14:
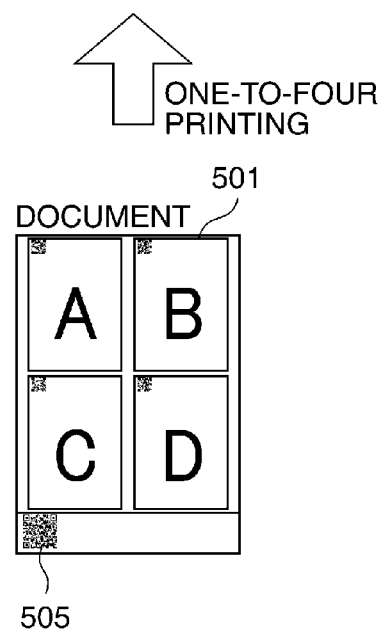

FIG. 14 is a view schematically showing a code reproduction method in the third embodiment of the present invention.

The document 501 is the reduction layout (four-up printing) of the four documents into one sheet, and the composite code symbol 505 includes the reproduction code information for reproducing the original documents before the reduction from the reduction image. In order to reproduce the original document images from the reduction layout document, the reduction layout type is first detected from the reproduction code information. Since the example shown in FIG. 12 is four-up printing, it is necessary to print with four-fold enlargement (the reduction layout document 501 in FIG. 14 is enlarged and outputted to four sheets 503-1 through 503-4).

Moreover, the reduction layout pattern is detected from the reproduction code information, and the page order at the time of the enlarged printing is determined based on the detected pattern. Furthermore, the magnification for restoring an image to 100% in size can be determined by detecting the document reduction ratio from the reproduction code information. The document images can be reproduced from the reduction layout document based on the number of sheets, the page order to reproduce, and the information about the magnification of the images, which are contained in the reproduction code information.

Moreover, the code symbols for the respective pages are reproduced from the code information 508-5 included in the composite code symbol 505, the original code symbols are deleted, and the reproduced code symbols 510-1 through 510-4 are formed at the deleted positions.

Figure 15:
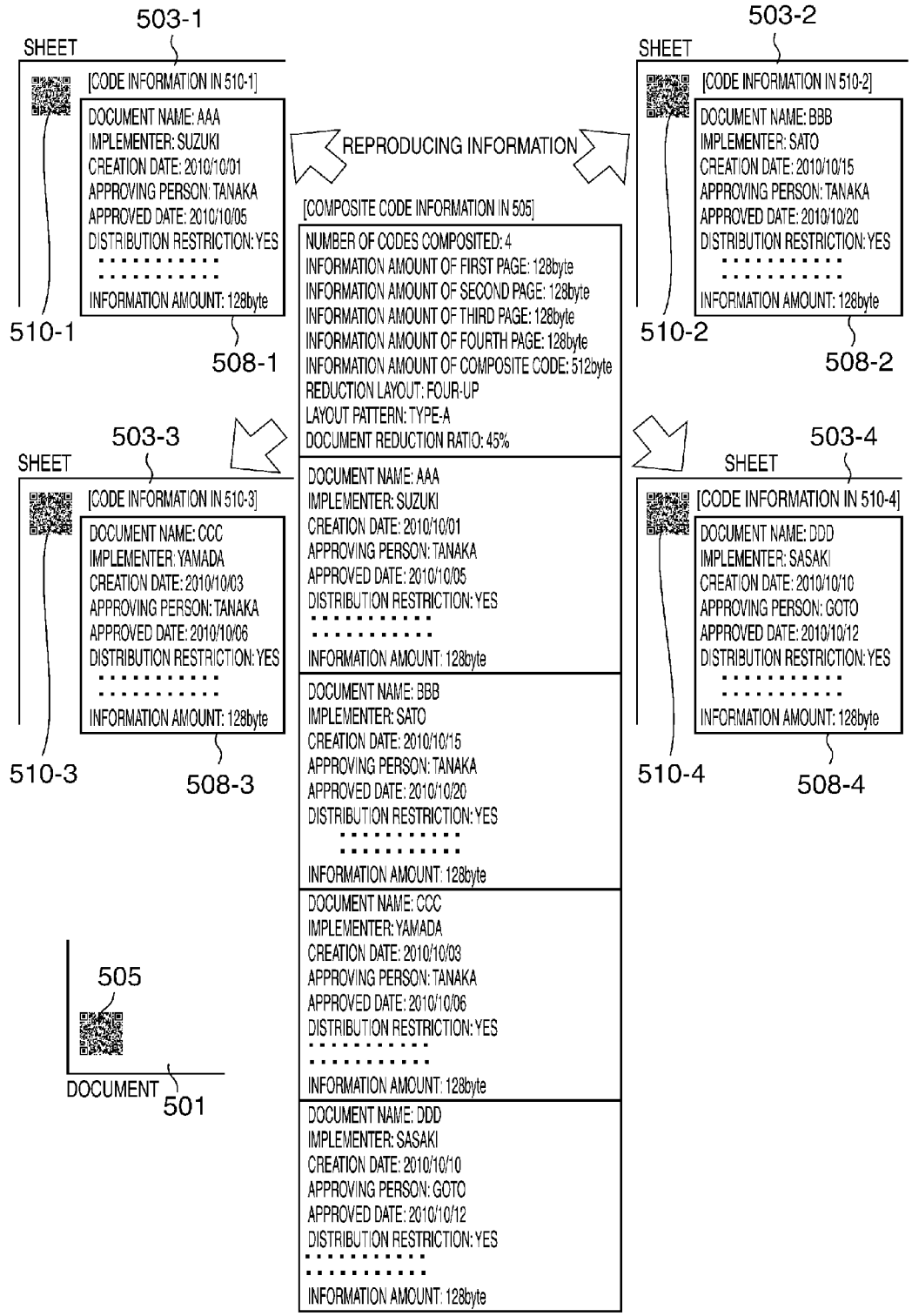
FIG. 15 is a view showing information about a composite code symbol containing the reproduction code information in one-to-four printing.

FIG. 15 is a view showing information about a composite code symbol containing the reproduction code information in one-to-four printing.

The code information that includes the reproduction code information is printed on the reduction layout document 501 as the composite code symbol 505 when the four documents are printed in the reduction layout (four-up printing). The composite code symbol 505 includes the code information 508-5 for the security purpose of documents, for example. The code information 508-5 contains a document name, an implementer, a creation date, an approving person, an approved date, and distribution restriction of a document, etc., for each of reduction layout pages.

Moreover, the code information 508-5 further includes the amount of the code information about all the codes, the reduction layout type (two-up, four-up, or eight-up), the reduction layout pattern described with reference to FIG. 11, the document reduction ratio determined by the imaging area, the reproduction code information for reproducing the original document images. Since the reduction layout document 501 shown in FIG. 15 is formed in the four-up printing, it should be enlarged one-to-four and printed in order to reproduce the original document images.

Moreover, the reduction layout pattern is detected from the reproduction code information, and the page order at the time of the enlarged printing is determined based on the detected pattern. Furthermore, the magnification for restoring an image to 100% in size can be determined by detecting the document reduction ratio from the reproduction code information. The original document images can be reproduced from the reduction layout document based on the number of sheets, the page order to reproduce, and the information about the magnification of the images, which are contained in the reproduction code information.

Moreover, since the position of the code information for each page in the composite code symbol 505 can be determined, the four pieces of code information 508-1 through 508-4 for the respective pages can be reproduced. The code symbols 510-1 through 510-4 can be reproduced based on the four pieces of code information 508-1 through 508-4 for the respective pages. Then, the original code symbols are deleted, and the reproduced code symbols 510-1 through 510-4 are formed at the deleted positions.

Figure 16A:
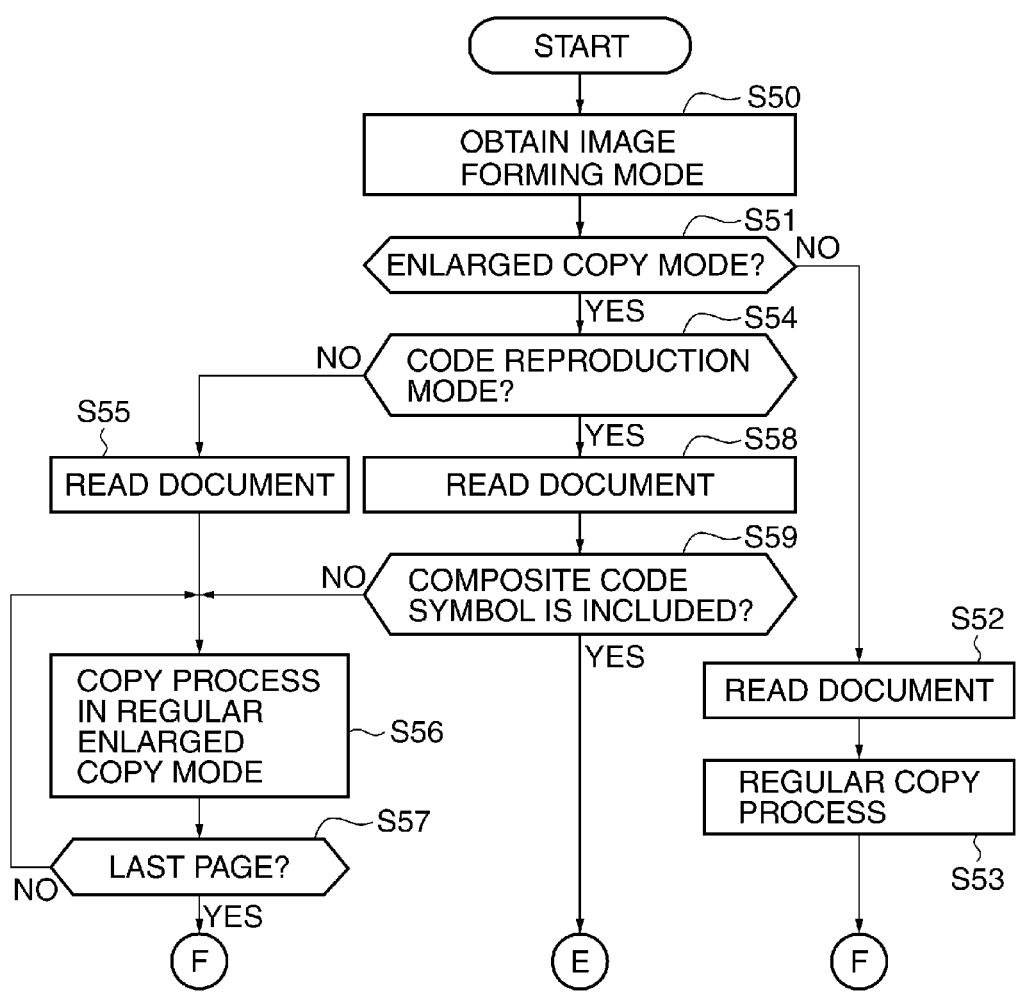
FIG. 16A is a flowchart showing a part of an image forming process according to the third embodiment of the present invention.
Figure 16B:
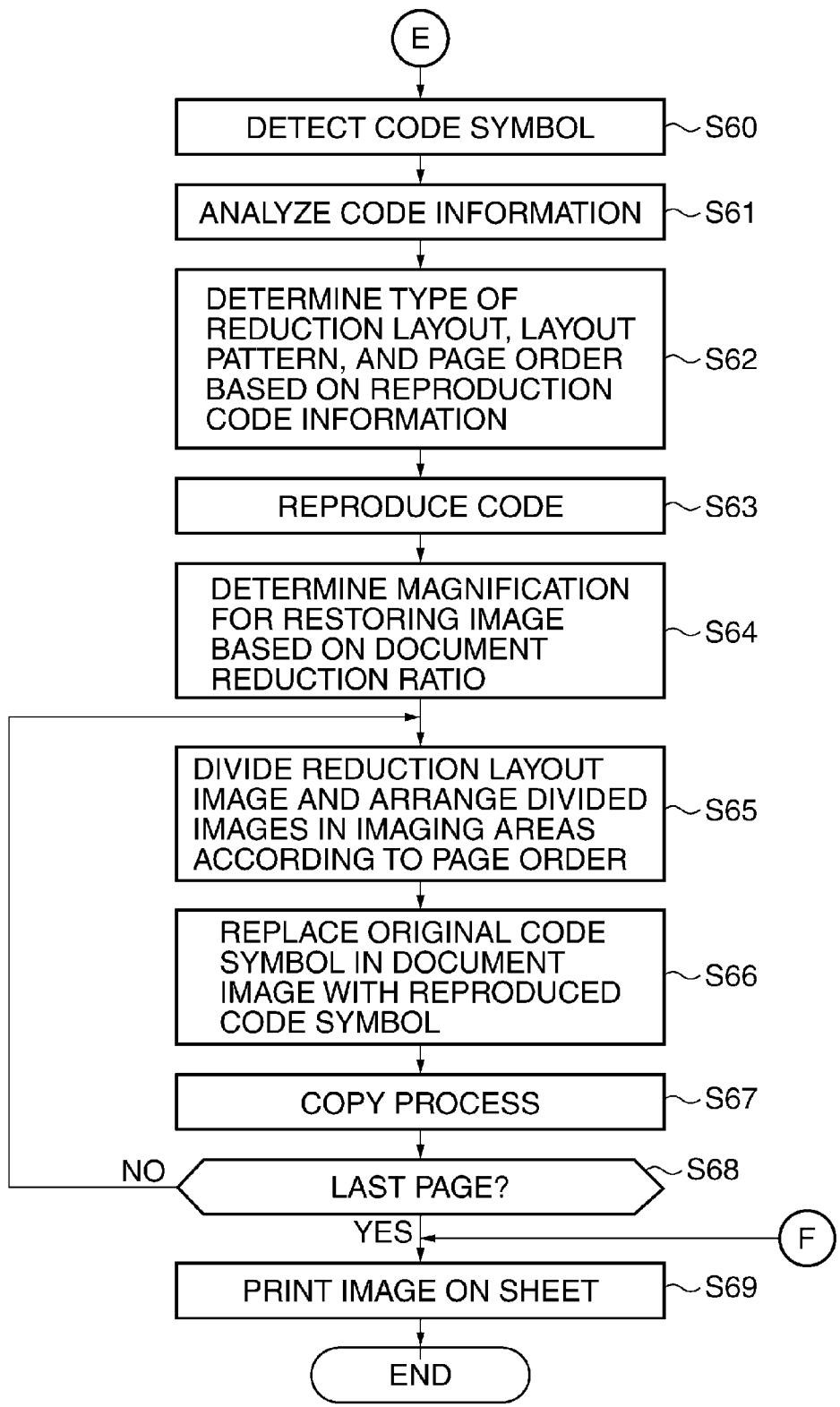
FIG. 16B is a flowchart showing the remainder of the image forming process according to the third embodiment of the present invention.
Figure 17:
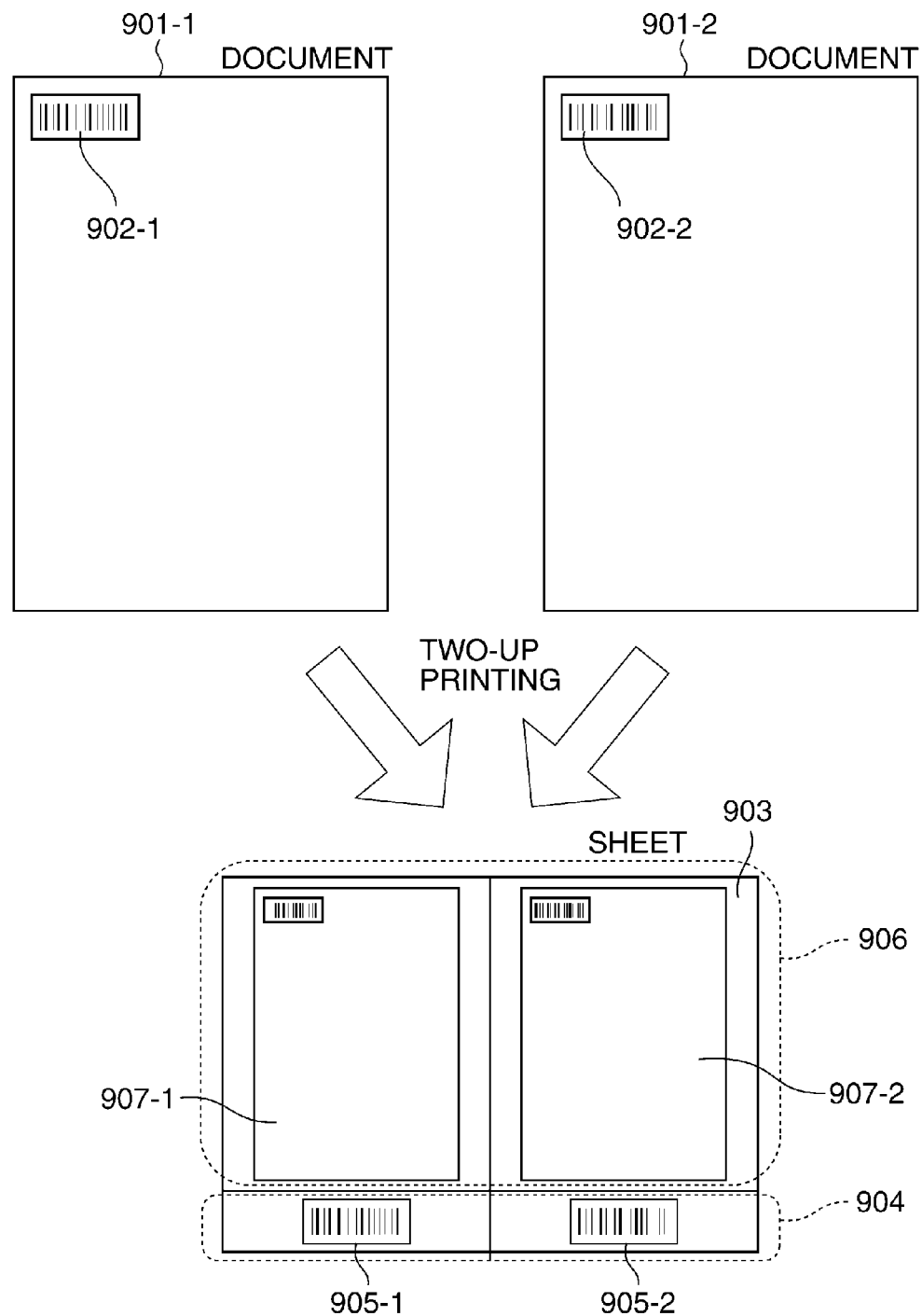
FIG. 17 is a view schematically showing the conventional reduction layout in the two-up printing.

FIG. 16A and FIG. 16B are flowcharts showing an image forming process according to the third embodiment of the present invention. This process will be described including a process for reproducing original documents before a reduction layout from a composite code symbol of the reduction layout document containing reproduction code information.

As shown in FIG. 16A, when a user presses the start key 301 of the operation unit 30 to instruct to start an image forming operation, the control unit 50 obtains an image forming mode from the operation display control unit 55 (step S50).

In the next step S51, the control unit 50 determines whether the obtained image forming mode is an enlarged copy mode in which images in the reduction layout document 501 is divided into four parts that are printed on the sheets 503-1 through 503-4, respectively. When determining that the image forming mode is not the enlarged copy mode (NO in the step S51), the control unit 50 instructs the document feeding control unit 54 and the reader-scanner control unit 51 to read an document 501 (step S52), instructs the printer control unit 52 to perform a regular copy process (step S53), and proceeds with the process to step S69 in FIG. 16B.

When determining that the image forming mode is the enlarged copy mode (YES in the step S51), the control unit 50 determines whether the mode is a code reproduction mode (step S54). When determining that the image forming mode is not the code reproduction mode (NO in the step S54), the control unit 50 instructs the document feeding control unit 54 and the reader-scanner control unit 51 to read a document 501 (step S55), instructs the printer control unit 52 to perform a copy process in the regular enlarged copy mode (step S56), and determines whether the page currently printed is the last page (step S57). Then, the control unit 50 repeatedly performs the process in the step S56 until detecting the last page in the step S57. When detecting the last page, the control unit 50 proceeds with the process to the step S69 in FIG. 16B.

On the other hand, when determining that the current mode is the code reproduction mode (YES in the step S54), the control unit 50 instructs to read the document 501 (step S58), and determines whether the document 501 includes a composite code symbol 505 (step S59). When there is no composite code symbol 505 (NO in the step S59), the control unit 50 proceeds with the process to the step S56.

When there is the composite code symbol 505 (YES in the step S59), the control unit 50 detects the composite code symbol 505 (step S60), and analyzes the code information 508-5 in the detected composite code symbol 505 (step S61).

Next, the control unit 50 determines the type of the reduction layout, the layout pattern, and the page order based on the reproduction code information within the code information 508-5 (step S62), and reproduces the code symbols 510-1 through 510-4 for the respective pages as shown in FIG. 15 (step S63).

In the next step S64, the control unit 50 determines the magnification for restoring an image to 100% in size based on the document reduction ratio from the reproduction code information in the code information 508-5. Then, the control unit 50 divides the image, arranges the divided images of 100% in size in the imaging areas in step S65 according to the page order.

In the next step S66, the control unit 50 deletes the code symbol of the original document image, and arranges the reproduced code symbol at the deleted position. An enlargement process and an image forming process are executed because the control unit 50 gives instructions to the image signal control unit 53. Then, the control unit 50 performs the copy process in step S67, determines whether the page currently printed is the last page in step S68, and repeatedly performs the process from the step S65 to the step S67 until detecting the last page.

When detecting the last page to be printed in the step S68, the control unit 50 proceeds with the process to the step S69, and instructs the printer control unit 52 to form an image on a sheet.

According to the above-mentioned embodiment, when document images of multiple consecutive pages are reduced and arranged into one page to print (the reduction layout), the information about the code symbols of the multiple pages that are reduced and arranged into one page is analyzed. Then, the information about the code symbols of the multiple pages is composited to one composite code symbol, and also the reproduction code information is stored in the composite code symbol. Thereby, the original documents before the reduction layout can be reproduced from the reduction layout image with the correct page order and the correct magnification based on the reproduction code information.

The above-mentioned first, second, and third embodiments describe the reduction layout of documents to one sheet or the enlarged copy of one document to multiple sheets. When the same control is repeated, the reduction layout images can be continuously formed on multiple sheets, or the enlarged copies of multiple documents can be performed.

Moreover, the embodiments describe the printing processes in the reduction layout mode and the enlarged copy mode. However, the processes of the embodiments are applicable to image formation other than printing. For example, images that are reduced and arranged in the reduction layout or images divided in the enlarged copy mode may be stored in a storage device of the image forming apparatus or an external storage device as electronic data. Furthermore, a document image is not only a printed image on a sheet, but may be also electronic data stored in the storage device of the image forming apparatus or the external storage device and the outside.

Furthermore, when a code symbol is detected from a document image, the control unit 50 may determine whether the code symbol concerned is readable in a coding method of the code symbol even if the code symbol is reduced and laid out by the reduction layout function. When the control unit determines that the code symbol is readable in the reduction layout, it becomes unnecessary to obtain code information from the code symbol, to generate a new composite code symbol, to reserve a code area and an imaging area, to arrange the new composite code symbol in the code area, and to form the reduction images in the imaging area. Accordingly, the multiple images are reduced and arranged within the entire image formable area of the sheet.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183268, filed on Aug. 22, 2012, which is hereby incorporated by reference herein in its entirety.

What is claimed is:

1. An image forming apparatus having a reduction layout function that reduces and arranges multiple images to one page of a sheet, comprising:
    a code symbol detection unit configured to detect a first code symbol on a first sheet and second code symbol on a second sheet;
    a code information obtaining unit configured to obtain first code information from the first code symbol and second code information from the second code symbol;
    a code symbol generation unit configured to generate a composite code symbol by compositing the first code information and the second code information;
    an area reservation unit configured to reserve a code area in which the composite code symbol of a predetermined size more than the minimum readable size is arranged in an image formable area of a sheet, and to define an imaging area by removing the code area from the image formable area of the sheet; and
    an arrangement unit configured to arrange the composite code symbol in the code area, and to reduce and arrange the multiple images in the imaging area.

2. The image forming apparatus according to claim 1, further comprising:
    a determination unit configured to determine whether the sheet has a non-printing area in which the composite code symbol of the predetermined size more than the minimum readable size can be arranged when the multiple images are reduced and arranged in one page of the sheet,
    wherein said area reservation unit does not reserve the code area and said arrangement unit arranges the composite code symbol in the non-printing area and reduces and arranges the multiple images in the image formable area, when said determination unit determines that the sheet has the non-printing area in which the composite code symbol of the predetermined size can be arranged, and,
    wherein said area reservation unit reserves the code area and defines the imaging area and said arrangement unit arranges the composite code symbol in the code area and reduces and arranges the multiple images in the imaging area, when said determination unit determines that the sheet does not have a non-printing area in which the composite code symbol of the predetermined size can be arranged.

3. The image forming apparatus according to claim 1, wherein said code symbol generation unit generates a new composite code symbol by adding at least one of the number of pieces of the code information, the information amount of each page, the total quantity of the code information about all the pages, a reduction layout type, a reduction layout pattern, and a document reduction ratio, to the pieces of the code information that are obtained by said code information obtaining unit.

4. The image forming apparatus according to claim 1, further comprising:
    an enlargement unit configured to reproduce original document images before the reduction layout from the reduction layout image formed with the reduction layout function;
    a reproduction-code-information obtaining unit configured to obtain reproduction code information used for reproducing the original document images before the reduction layout from the composite code symbol included in the reduction layout image,
    wherein said enlargement unit reproduces the original document images before the reduction layout from the reduction layout image based on the reproduction code information obtained by said reproduction-code-information obtaining unit.

5. The image forming apparatus according to claim 1, further comprising:
    a second determination unit configured to determine whether the code symbols detected by said code symbol detection unit are readable even after the reduction layout with the reduction layout function,
    wherein said code symbol generation unit does not generate a composite code symbol, said area reservation unit does not reserve a code area, and said arrangement unit reduces and arranges images in the image formable area, when said second determination unit determines that the code symbols are readable, and
    wherein said code symbol generation unit generates the composite code symbol, said area reservation unit reserves the code area and defines the imaging area, and said arrangement unit arranges the composite code symbol in the code area and reduces and arranges images in the imaging area, when said second determination unit determines that the code symbols are readable.

6. An image forming method for an image forming apparatus having a reduction layout function that reduces and arranges multiple images to one page of a sheet, the image forming method comprising:
    a code symbol detection step of detecting a first code symbol on a first sheet and second code symbol on a second sheet;
    a code information obtaining step of obtaining first code information from the first code symbol and second code information from the second code symbol;
    a code symbol generation step of generating a composite code symbol by compositing the first code information and the second code information;
    an area reservation step of reserving a code area in which the composite code symbol of a predetermined size more than the minimum readable size is arranged in an image formable area of a sheet, and defining an imaging area by removing the code area from the image formable area of the sheet; and an arrangement step of arranging the composite code symbol in the code area, and reducing and arranging the multiple images in the imaging area.

7. The image forming method according to claim 6, further comprising:

a determination step of determining whether the sheet has a non-printing area in which the composite code symbol of the predetermined size more than the minimum readable size can be arranged when the multiple images are reduced and arranged in one page of the sheet, wherein a code area is not reserved in said area reservation step, the composite code symbol is arranged in the non-printing area and the multiple images are reduced and arranged in the image formable area, when it is determined that the sheet has the non-printing area in which the composite code symbol of the predetermined size can be arranged in said determination step, and, wherein the code area is reserved and the imaging area is defined in said area reservation step, and the composite code symbol is arranged in the code area and the multiple images are reduced and arranged in the imaging area, when it is determined that the sheet does not have a non-printing area in which the composite code symbol of the predetermined size can be arranged.

8. The image forming method according to claim 6, wherein a new composite code symbol is generated in said code symbol generation step by adding at least one of the number of pieces of the code information, the information amount of each page, the total quantity of the code information about all the pages, a reduction layout type, a reduction layout pattern, and a document reduction ratio, to the pieces of the code information that are obtained in said code information obtaining step.

9. The image forming method according to claim 6, further comprising:

an enlargement step of reproducing original document images before the reduction layout from the reduction layout image formed with the reduction layout function; and a reproduction-code-information obtaining step of obtaining reproduction code information used for reproducing the original document images before the reduction layout from the composite code symbol included in the reduction layout image, wherein the original document images before the reduction layout are reproduced in said enlargement step from the reduction layout image based on the reproduction code information obtained in said reproduction-code-information obtaining step.

10. The image forming method according to claim 6, further comprising:

a second determination step of determining whether the code symbols detected in said code symbol detection step are readable even after the reduction layout with the reduction layout function, wherein the multiple images are reduced and arranged in the image formable area in said arrangement step without executing said code symbol generation step and said area reservation step, when it is determined that the code symbols are readable in said second determination step, and wherein the composite code symbol is generated in said code symbol generation step, the code area is reserved and the imaging area is defined in said area reservation step, and the composite code symbol is arranged in the code area and the multiple images are reduced and arranged in the imaging area in said arrangement step, when it is determined that the code symbols are not readable in said second determination step.

11. A non-transitory computer-readable storage medium storing a control program causing a computer to execute an image forming method for an image forming apparatus having a reduction layout function that reduces and arranges multiple images to one page of a sheet, the image forming method comprising:

a code symbol detection step of detecting a first code symbol on a first sheet and second code symbol on a second sheet;

a code information obtaining step of obtaining first code information from the first code symbol and second code information from the second code symbol;

a code symbol generation step of generating a composite code symbol by compositing the first code information and the second code information;

an area reservation step of reserving a code area in which the composite code symbol of a predetermined size more than the minimum readable size is arranged in an image formable area of a sheet, and defining an imaging area by removing the code area from the image formable area of the sheet; and an arrangement step of arranging the composite code symbol in the code area, and reducing and arranging the multiple images in the imaging area.

* * * * *